US008560135B2

(12) United States Patent
Tomita et al.

(10) Patent No.: US 8,560,135 B2
(45) Date of Patent: Oct. 15, 2013

(54) ENERGY MANAGEMENT SYSTEM, ENERGY MANAGEMENT APPARATUS, AND ENERGY MANAGEMENT METHOD

(75) Inventors: Yasushi Tomita, Mito (JP); Masahiro Watanabe, Hitachi (JP); Takafumi Ebara, Yokohama (JP); Yuichi Otake, Kawasaki (JP); Akira Kobayashi, Tokyo (JP); Hideyuki Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 13/028,388

(22) Filed: Feb. 16, 2011

(65) Prior Publication Data
US 2011/0238232 A1 Sep. 29, 2011

(30) Foreign Application Priority Data
Mar. 29, 2010 (JP) ................................. 2010-074822

(51) Int. Cl.
*G05D 3/12* (2006.01)
(52) U.S. Cl.
USPC .......................................................... 700/291
(58) Field of Classification Search
USPC .......................................................... 700/291
See application file for complete search history.

(56) References Cited

U.S. PATENT DOCUMENTS

| 4,714,868 | A * | 12/1987 | Maruyama et al. | 320/101 |
| 5,751,133 | A * | 5/1998 | Sato et al. | 320/101 |
| 6,346,670 | B1 * | 2/2002 | Fujii et al. | 136/252 |
| 7,876,070 | B2 * | 1/2011 | Kitahara | 320/134 |
| 8,330,415 | B2 * | 12/2012 | Sato et al. | 320/109 |
| 2002/0121298 | A1 * | 9/2002 | Konold | 136/248 |
| 2007/0276547 | A1 * | 11/2007 | Miller | 700/295 |
| 2010/0076825 | A1 * | 3/2010 | Sato et al. | 705/14.1 |

FOREIGN PATENT DOCUMENTS

| JP | 2000055479 A | * | 2/2000 |
| JP | 2004-208426 | | 7/2004 |
| JP | 2004208456 A | * | 7/2004 |
| JP | 2006-304402 | | 11/2006 |

(Continued)

OTHER PUBLICATIONS

Chinese office action mailed Apr. 26, 2013; Application No. 201110041790.4.

(Continued)

*Primary Examiner* — Mohammad Ali
*Assistant Examiner* — Sivalingam Sivanesan
(74) *Attorney, Agent, or Firm* — Antonelli, Terry, Stout & Kraus, LLP.

(57) ABSTRACT

An energy management system includes an equipment data management unit which manages charging/discharging loss of a battery and heat radiation loss of an electric water heater, and causes a control unit to perform control to give priority based on the comparison to the energy storage facility more reducing loss and store energy. The energy management system includes a system operation calculation unit which predicts voltage distribution of the next day of a distribution system or demand-and-supply balance amount of the entire system by state monitoring data of a power system, calculates a demand amount increasing target value necessary for avoiding a photovoltaic power generation amount suppression on a consumer end by the voltage distribution of the next day of the distribution system or the demand-and-supply balance amount, and controls the energy storage facilities so as to satisfy the demand amount increasing target value on the consumer end.

11 Claims, 14 Drawing Sheets

SYSTEM CONFIGURATION EXAMPLE OF FIRST EMBODIMENT

(56) References Cited

FOREIGN PATENT DOCUMENTS

| JP | 2006304402 A | * | 11/2006 |
| JP | 2010-081722 | | 4/2010 |
| JP | 2010-166636 | | 7/2010 |
| JP | 2010166636 A | * | 7/2010 |

OTHER PUBLICATIONS

Asari et al., "Control Method for Reverse Power Flow of Photovoltaic Generation System-Operation Planning for Heat Pump Water Heater in Accordance With Uncertainty Forecast-", Annual Conference of Power & Energy Society, IEE of Japan, 2009.

* cited by examiner

SYSTEM CONFIGURATION EXAMPLE OF FIRST EMBODIMENT

PV POWER GENERATION AMOUNT CHARACTERISTIC DATA

| TIME | SOLAR RADIATION INTENSITY | PV POWER GENERATION AMOUNT | POWER DEMAND AMOUNT | DEMAND-AND-SUPPLY BALANCE AMOUNT | PV SURPLUS POWER AMOUNT | HOT WATER DEMAND AMOUNT |
|---|---|---|---|---|---|---|
| 0:00 | *.** | *.** | *.** | *.** | *.** | *.** |
| 1:00 | *.** | *.** | *.** | *.** | *.** | *.** |
| 2:00 | *.** | *.** | *.** | *.** | *.** | *.** |
| 3:00 | *.** | *.** | *.** | *.** | *.** | *.** |
| ⋮ | | | | | | |
| 24:00 | *.** | *.** | *.** | *.** | *.** | *.** |

NEXT DAY DEMAND-AND-SUPPLY PREDICTION TABLE DATA

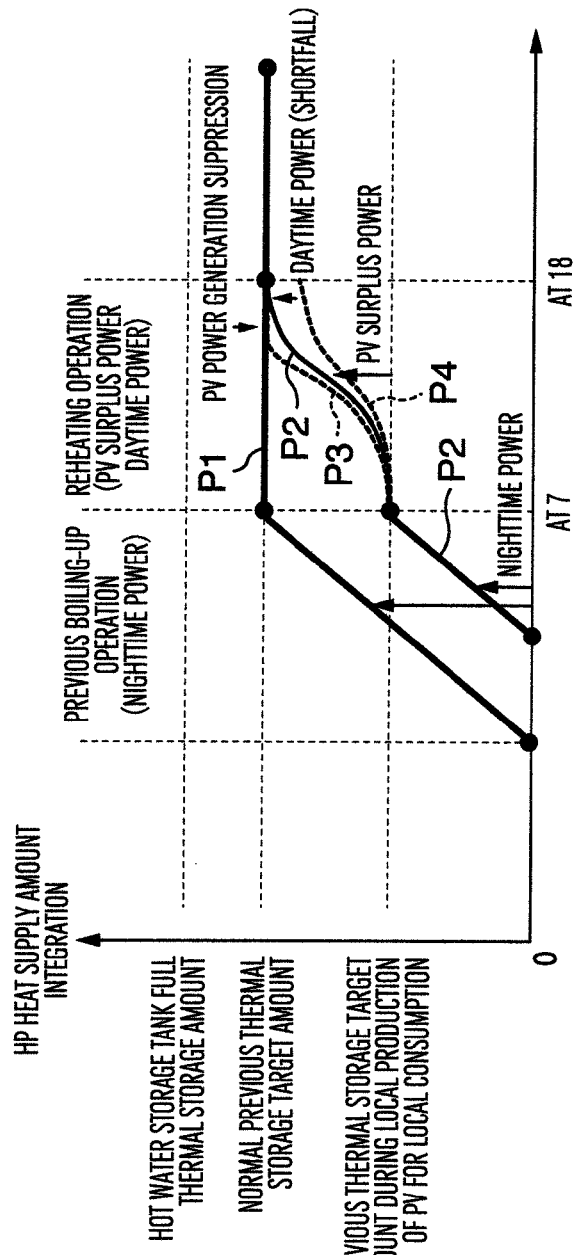
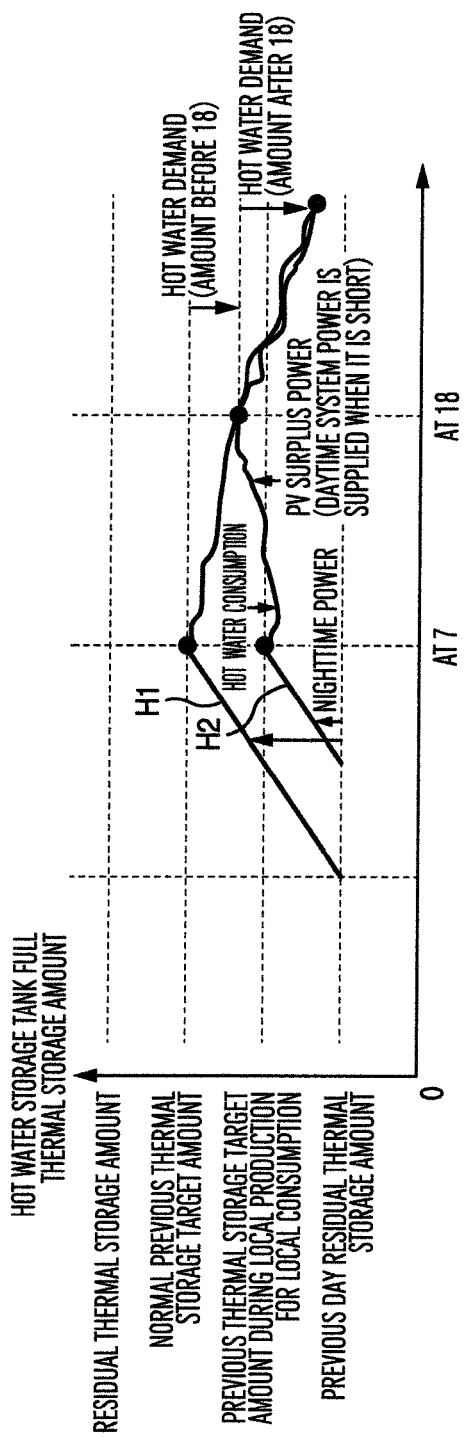
FIG.7A
FIG.7B

SYSTEM CONFIGURATION EXAMPLE OF SECOND EMBODIMENT

SYSTEM CONFIGURATION EXAMPLE OF THIRD EMBODIMENT

SYSTEM CONFIGURATION EXAMPLE OF FOURTH EMBODIMENT

ENERGY MANAGEMENT SYSTEM, ENERGY MANAGEMENT APPARATUS, AND ENERGY MANAGEMENT METHOD

BACKGROUND OF THE INVENTION

The present invention relates to an energy management system applied at the time of operating energy equipment such as photovoltaic power generation facilities, a battery, and an electric water heater on a consumer end, and an energy management apparatus applied to the system and which is installed on a consumer or in the vicinity of the consumer.

Photovoltaic power generation facilities are assumed to be introduced and expanded in preparation for reduction in a load to global environment. However, the following is feared in cooperation and expansion to a power system of the photovoltaic power generation facilities. That is, due to a reverse power flow of photovoltaic generated power in a distribution system, a voltage rises up and a voltage control is influenced, or supply power of the entire system increases and a demand-and-supply balance control is influenced.

As one method of measures, a time zone of a thermal storage operation in an electric water heater installed on a consumer end is considered to be adjusted. Specifically, the electric water heater is operated such that a hot water is stored in a hot water storage tank by using cheaper electricity during a nighttime and the hot water is used during a daytime of the next day. When a photovoltaic power generation amount during a daytime of the next day is predicted to be large, a thermal storage operation during the nighttime of the previous day is suppressed and a thermal storable amount of the next day is increased. When the thermal storage operation is performed in conformity to a time zone at which a photovoltaic power generation amount during the daytime of the next day is large, a power demand is increased.

On the other hand, a reverse power flow in the above-described distribution system or an increase in a power supply of the entire system is considered to be reduced (see, for example, "Control Method for Reverse Power Flow of Photovoltaic Generation System-Operation Planning for Heat Pump Water Heater in accordance with Uncertainty Forecast-" Annual Conference of Power & Energy Society, IEE of Japan, August 2009).

The characteristics of the above-described method are summarized as follows. That is, when the above-described distribution voltage increase is caused by a power generation of the photovoltaic power generation during the daytime, the power generation amount is automatically suppressed by a voltage increase suppression function of the photovoltaic power generation facilities. However, the suppressed power generation amount can be effectively used by the thermal storage operation of the electric water heater. In general, a large amount of hot water is demanded by consumers also after the time zone at which power is generated during the daytime by the photovoltaic power generation facilities. Even if the thermal storage operation is moved as described above from the time zone of the nighttime of the previous day to the time zone at which power is generated during the daytime by the photovoltaic power generation facilities, a hot water is not short, and therefore, user-friendliness of the consumers is not impaired. Further, since the previously-installed electric water heater is used for the use of hot water, a special initial cost does not occur.

SUMMARY OF THE INVENTION

When a battery is introduced to a consumer end in the future, a battery also is expected to be used for consuming a photovoltaic power generation amount in the same manner as in an electric water heater. That is, a battery is considered to be charged at the time zone at which a photovoltaic power generation amount is large. At this time, in a battery and an electric water heater, charging loss of the battery and heat radiation loss of the electric water heater are different from each other in terms of the total energy efficiency. There arises the problem on the optimal operating method in which a charging operation of the battery and a thermal storage operation of the electric water heater are combined during the consumption of the photovoltaic power generation amount.

Further, for example, a voltage distribution in a distribution system is influenced not only by conditions of the consumer but also by load conditions of the entire distribution system. Therefore, even if the demand amount is similarly increased on the consumer end, a voltage increase suppression function of the photovoltaic power generation facilities might operate to suppress the power generation amount depending on conditions of the distribution system.

Further, there arises the possibility that when the power generation amount of the photovoltaic power generation facilities is larger than a capacity of the electric water heater or battery on the consumer end, the consumer cannot help suppressing the power generation amount of the photovoltaic power generation facilities. There arises the problem as to how the amount of load capable of consuming the photovoltaic power generation amount.

To solve the above-described problem, it is an object of the present invention to provide a unit which can attain optimal operation of energy storage facilities for improving a total energy efficiency, avoiding the voltage increase suppression function of the photovoltaic power generation facilities, and maximizing a consumable amount in the consumption using the energy storage facilities of the photovoltaic power generation amount.

In view of the foregoing, it is an object of the present invention to provide an energy management system including an energy storage controller for performing control to store power generated by photovoltaic power generation facilities in energy storage facilities. According to one aspect of the present invention, this energy management system includes: a battery and an electric water heater as the energy storage facilities; a control unit to control thermal storage of the electric water heater and charging of the battery as the energy storage controller; and an equipment data management unit to manage data on charging/discharging loss of the battery and data on heat radiation loss of the electric water heater, wherein the equipment data management unit causes the control unit to perform control to compare the charging/discharging loss and the heat radiation loss, give priority based on the comparison to the energy storage facility more reducing loss and store energy therein.

According to another aspect of the present invention, the energy management system further includes: a system operation calculation unit for predicting a voltage distribution at a predetermined time of a distribution system or a demand-and-supply balance amount of the entire system by using state monitoring data of a power system; and a consumer cooperation calculation unit for acquiring prediction information on the voltage distribution at a predetermined time of the distribution system or on the demand-and-supply balance amount from the system operation calculation unit and calculating a demand amount increasing target value necessary for avoiding a power generation amount suppression of photovoltaic power generation facilities on a consumer end, wherein the control unit acquires the demand amount increasing target value from the consumer cooperation calculation unit, and controls the energy storage facilities so as to satisfy the demand amount increasing target value on the consumer end.

Further, in this case, when a capacity of the energy storage facilities for consuming the photovoltaic power generation amount in one consumer is short, the energy management system performs control to cause the energy storage facilities of other neighboring consumers to consume the photovoltaic power generation amount. Further, when the photovoltaic power generation amount for storing energy in the energy storage facilities within one consumer is short, the energy management system performs control to store energy in the energy storage facilities including the photovoltaic power generation amount of other neighboring consumers.

According to the present invention, in cooperation and expansion to a power system of the photovoltaic power generation facilities, the energy management system can reduce an impact on the power system, increase the photovoltaic power generation amount on the consumer end, and generate and consume power with high efficiency and low carbon emissions.

BRIEF DESCRIPTION OF THE DRAWINGS

FIGS. 7A and 7B are characteristic diagrams illustrating one example of an operation state according to the first embodiment of the present invention;

DETAILED DESCRIPTION OF THE INVENTION

Figure 15:
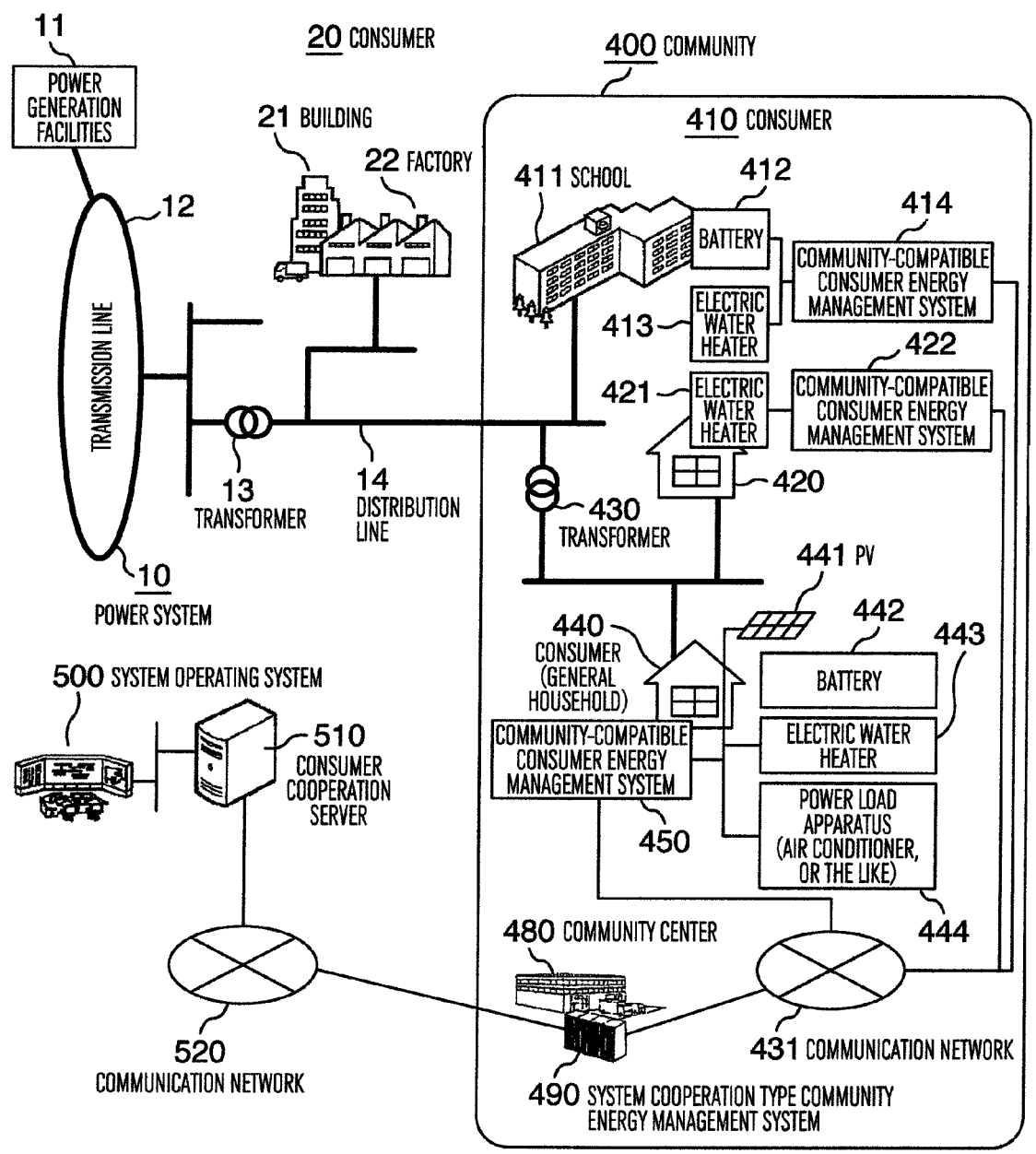
FIG. 15 illustrates the entire configuration example of a system according to a fourth embodiment of the present invention.
Figure 16:
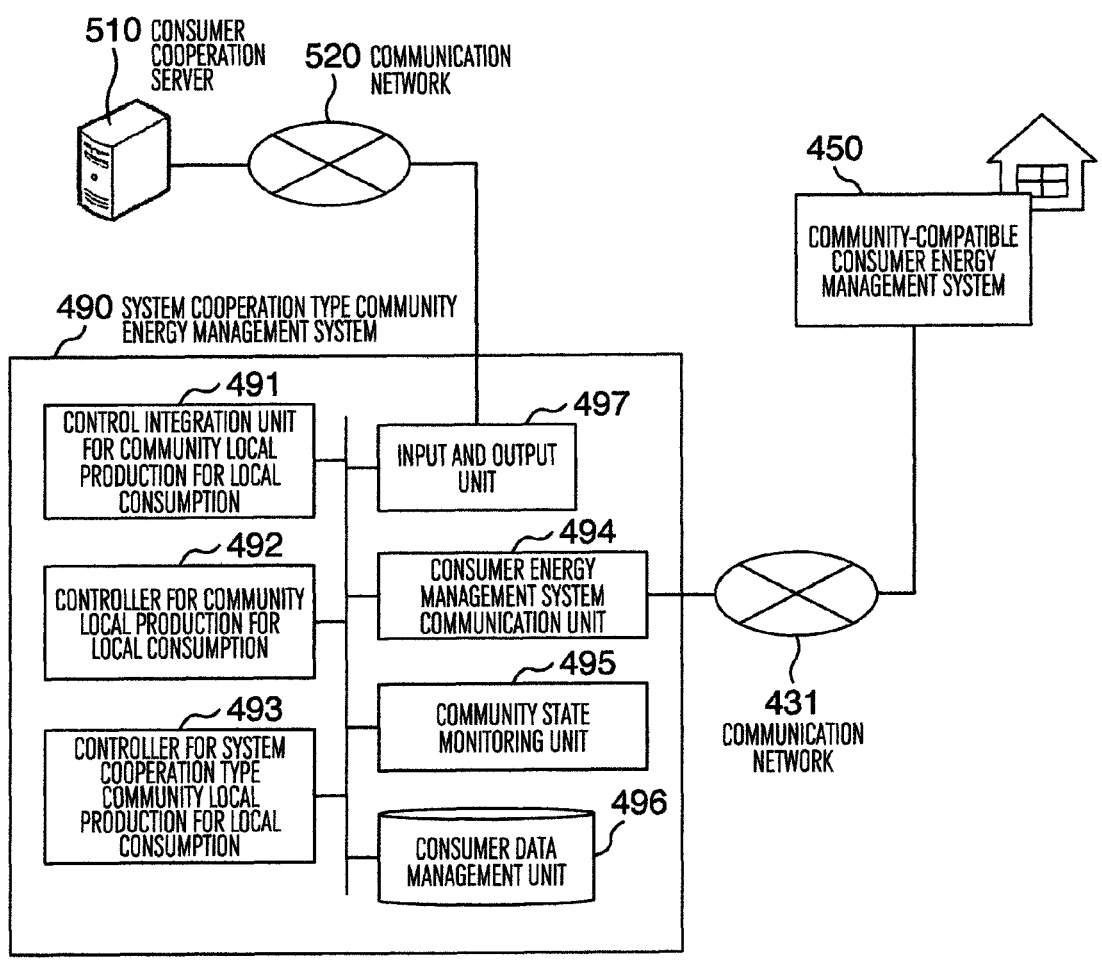
FIG. 16 is a functional block diagram illustrating a configuration example of a system cooperation type community energy management apparatus of the system according to the fourth embodiment of the present invention.

Hereinafter, preferred embodiments of the present invention will be described in the following order with reference to the accompanying drawings of the embodiments.
1. First embodiment (FIGS. 1 to 8)
2. Second embodiment (FIGS. 9 and 10)
3. Third embodiment (FIGS. 11 to 14)
4. Fourth embodiment (FIGS. 15 and 16)

1. First Embodiment

An energy management system according to a first embodiment of the present invention will be described with reference to FIGS. 1 to 8.

Figure 1:
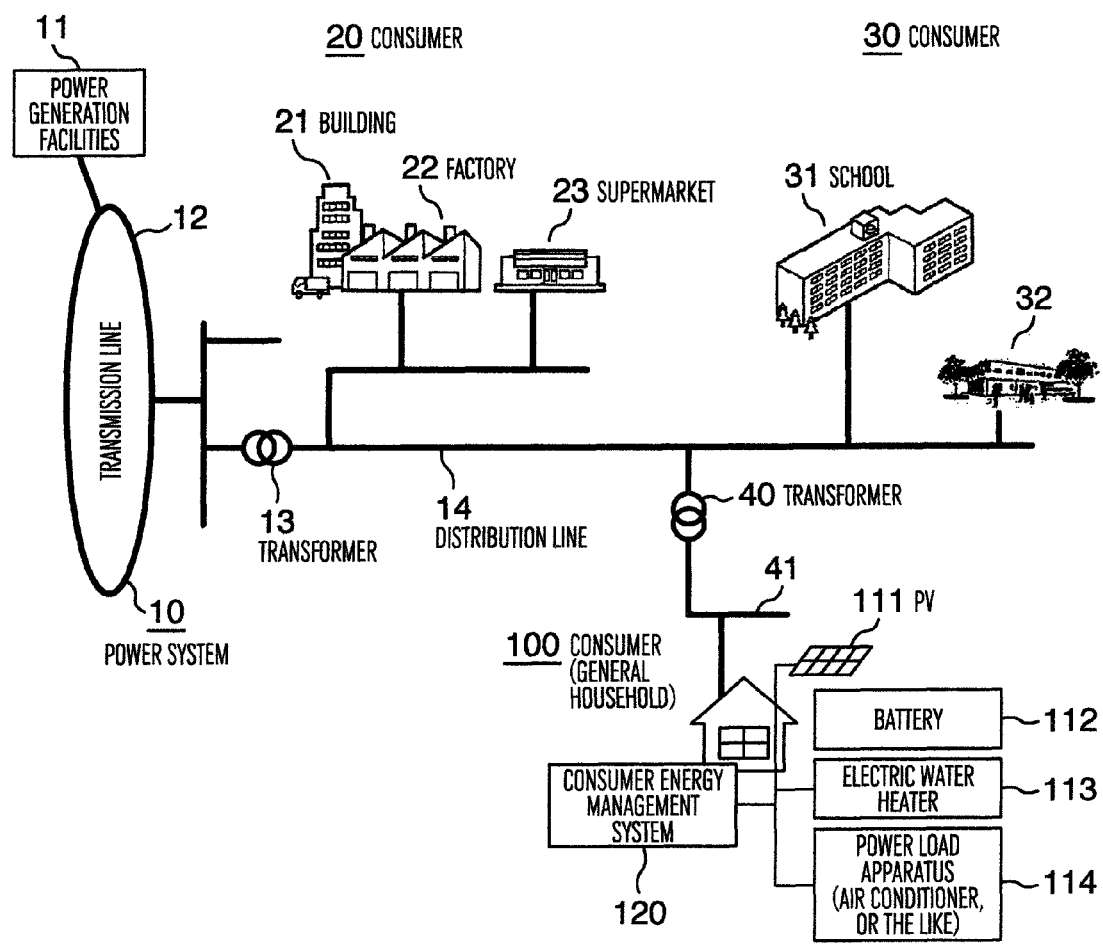
FIG. 1 is a configuration diagram illustrating the entire configuration example of a system according to a first embodiment of the present invention.

FIG. 1 illustrates the entire system configuration example according to the present embodiment.

In the present embodiment, the energy management system is configured by a power system 10 operated by an electric power company, consumers 20, 30, and 100 connected to the power system 10, and a consumer energy management apparatus 120 provided on the consumer 100.

The power system 10 supplies power acquired by power generation facilities 11 to a transformer 13 via a transmission line 12, and supplies power transformed by the transformer 13 via a distribution line 14 to buildings 21, factories 22, and supermarkets 23 as large-sized consumers 20. Further, the power system 10 supplies power also to schools 31, and community centers 32 as relatively large-sized consumers 30 in a residential district. Further, the power system 10 supplies power which was transformed by a transformer 40, to consumers 100 as general households via a distribution line 41.

On the consumer ends, photovoltaic power generation facilities (PV) 111 being facilities for receiving solar light to convert it into power, a battery 112 being a facility capable of storing or taking out electricity, and an electric water heater 113 being a facility for heating water by electricity to generate hot water and store it in a hot water storage tank are provided.

Further, on the consumer end, a power load apparatus 114 operated by power such as an air-conditioning apparatus is disposed. Also, the electric water heater 113 is used as one of the power load apparatus. The photovoltaic power generation facilities 111, the electric water heater 113, and the power load apparatus 114 are electrically connected to the distribution line 41. Further, charging is to store electricity in the battery 112, and on the other hand, discharging is to take out electricity from the battery 112.

When being a facility capable of charging/discharging power, how the battery 112 may be configured. A battery such as a lithium-ion battery and a nickel-hydrogen battery, and also a storage unit with a capacitor may be used as the battery 112. Further, in addition to a battery provided on a residential building as the consumer 100, for example, a battery mounted on a bicycle owned by the consumer 100 may be used as the battery 112.

As an apparatus for controlling the above-described facilities in the consumers 100, a consumer energy management apparatus (EMS) 120 is disposed.

The consumer energy management apparatus 120 monitors and controls states of respective devices on the consumer end. When the power generation amount of the photovoltaic power generation facilities 111 is large, the consumer energy management apparatus 120 performs a water heating operation of the electric water heater 113 or a charging operation of the battery 112, and controls local production for local consumption for consuming photovoltaic generated power in the consumers 100.

The apparatus 111, 112, 113, and 114 provided on the consumer end include a controller (not illustrated), respectively. Further, they include an interface capable of communicating with the consumer energy management apparatus 120, respectively. Further, they include a function of transferring state data on the power consumption amount to the consumer energy management apparatus 120, and receiving a control signal from the consumer energy management apparatus 120, respectively.

Figure 2:
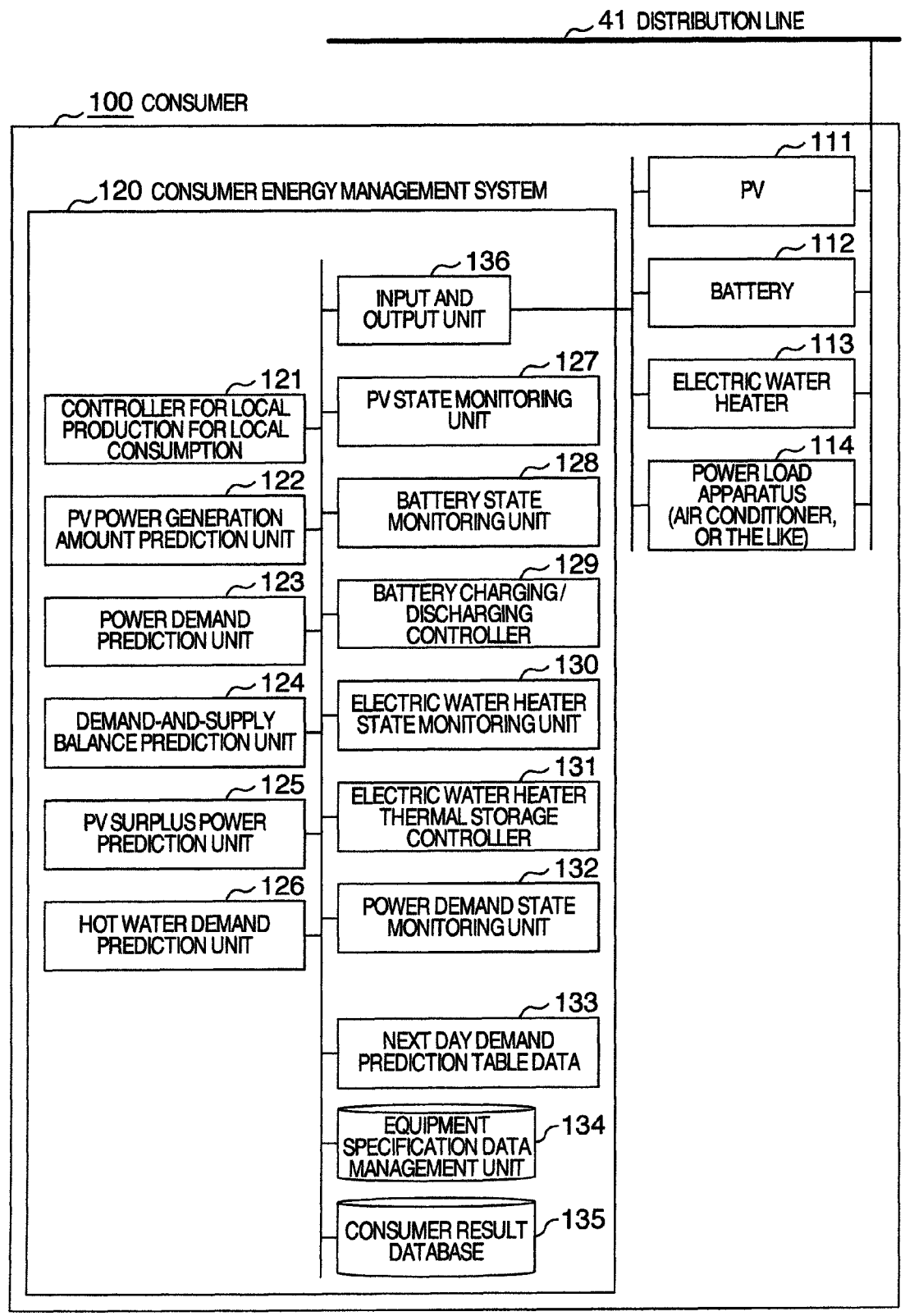
FIG. 2 is a functional block diagram illustrating a configuration example of a consumer energy management apparatus of the system according to the first embodiment of the present invention.

FIG. 2 is a functional block diagram illustrating the consumer energy management apparatus 120.

The consumer energy management apparatus 120 includes a controller for local production for local consumption 121, a photovoltaic power generation amount prediction unit 122, a power demand prediction unit 123, a demand balance prediction unit 124, a photovoltaic power generation surplus power prediction unit 125, and a hot-water demand prediction unit 126. Further, the consumer energy management apparatus 120 includes a photovoltaic power generation state monitoring unit 127, a battery state monitoring unit 128, a battery charging/discharging controller 129, an electric water heater state monitoring unit 130, an electric water heater thermal storage controller 131, a power demand state monitoring unit 132, a next day demand prediction table data storage unit 133, an equipment specification data management unit 134, a consumer result database 135, and an input and output unit 136.

The input and output unit 136 is an external interface which inputs data through a user or external apparatus (apparatus 111, 112, 113, and 114), or outputs data to the user or the external apparatus.

The equipment specification data management unit 134 manages data on the specification of equipment installed on the consumer end. Specifically, the management unit 134 manages data on the photovoltaic power generation facilities including rate output data, and power generation amount characteristic data of the photovoltaic power generation facilities.

The management unit 134 manages data on the battery 112 including data on a rated capacity, rated charging power, rated discharging power, battery loss, and charging/discharging loss of the battery 112. The management unit 134 manages data on the electric water heater 113 including data on an average COP (coefficient of performance: energy consumption efficiency) of a thermal storage operation and on an average heat radiation loss of a hot-water tank. The rate output of the photovoltaic power generation facilities 111 is a maximized promising power generation output of the photovoltaic power generation facilities in the case where solar radiation intensity is sufficiently present. The photovoltaic power generation amount characteristic data is data associating the promising photovoltaic power generation amount with respect to the solar radiation intensity.

Figures 3, 4:
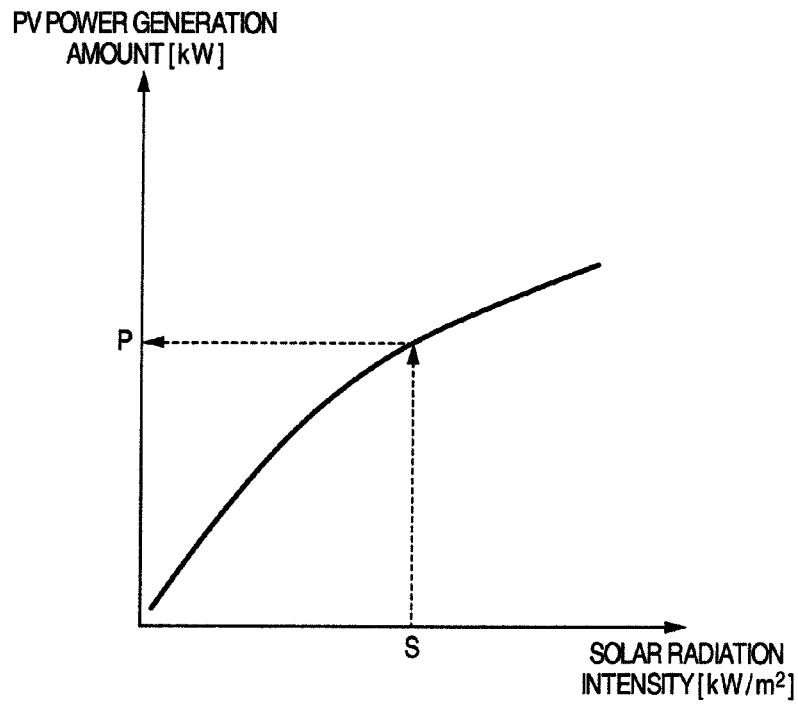
FIG. 3 is a characteristic diagram illustrating one example of a power generation amount characteristic of photovoltaic power generation facilities of the system according to the first embodiment of the present invention.
FIG. 4 is a schematic diagram illustrating one example of a configuration example of a next day demand-and-supply prediction table data of the system according to the first embodiment of the present invention.
Figure 5:
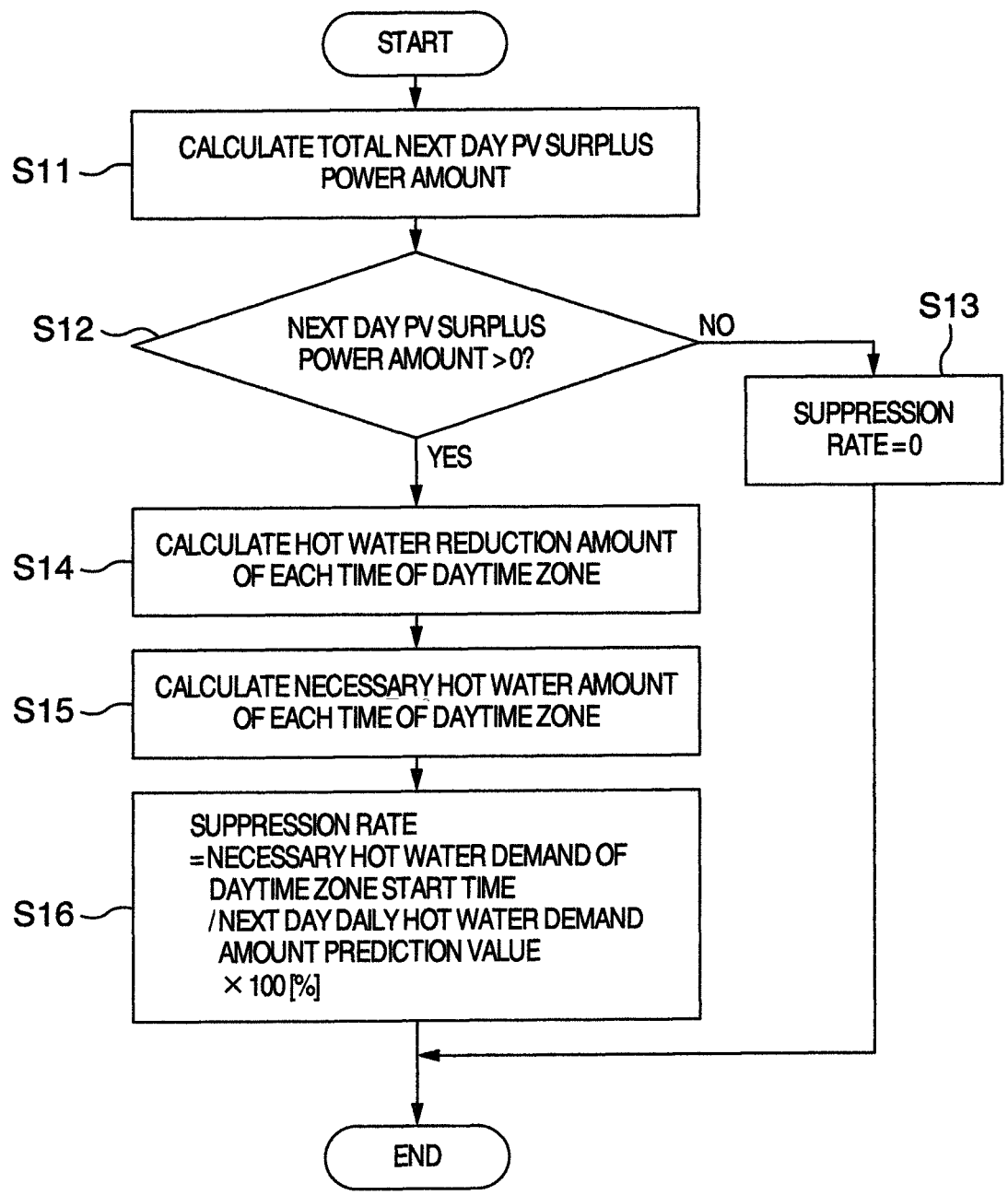
FIG. 5 is a flowchart illustrating a process flow for calculating a suppression rate of a nighttime thermal storage operation suppression of the system according to the first embodiment of the present invention.

FIG. 3 illustrates an example of the photovoltaic power generation amount characteristic data.

FIG. 3 represents that the promising photovoltaic power generation amount is equal to P at the time of the solar radiation intensity S.

The rated capacity of the battery is data representing a maximized electric energy stored in the battery 112. The rated output is data representing a maximized output of the battery 112. A battery loss represents a rate in which the electric energy stored in the battery 112 decreases along with the time, and is here set to a reduction rate [%] per hour. A charging/discharging loss represents a rate [%] of the electric energy lost in a converter for connecting the battery 112 and external devices at the time of charging/discharging the battery 112.

A COP of the thermal storage operation in the electric water heater 113 means energy efficiency of the thermal storage operation, and further means a ratio of the total amount of output energy to that of input energy in the thermal storage operation for a fixed period of time. The average COP means an average of COP values under several predetermined conditions. A heat radiation loss of the hot-water tank means a rate [%] in which a heat quantity of hot-water in the hot-water tank decreases per hour, and herein means a reduction rate per hour. Further, an average heat radiation loss means an average of heat radiation loss values under several predetermined conditions.

The photovoltaic power generation state monitoring unit 127 acquires and monitors the photovoltaic power generation amount from a control apparatus of the photovoltaic power generation facilities 111.

The battery state monitoring unit 128 predicts and manages a present state of the residual charge amount and the chargeable amount in the battery 112 by using the following method.

Charge the battery 112 for a predetermined fixed long time period.

Set the residual charge amount of this state to the charging capacity in specifications of the battery 112, and set the chargeable amount to zero.

Integrate the subsequent charging/discharging amount as needed by setting the charging to plus and the discharging to minus, and manage the integrated values as the charging/discharging amount integral values.

Update the residual charge amount to a value acquired by adding the charging/discharging amount integral value at that point to the previous value for each predetermined period. If the residual charge amount after the update is larger than the charging capacity, the residual charge amount is set to a value of the charging capacity. At the same time, the chargeable amount is updated to a value acquired by subtracting the charging/discharging amount integral value at that point from the previous value. If the chargeable amount after the update becomes negative, the chargeable amount is set to zero.

The electric water heater state monitoring unit 130 acquires information from the control apparatus of the electric water heater 113 and monitors a thermal storage operation state of the electric water heater 113. Suppose that the thermal storage operation state takes one in the case where the thermal storage operation is operated, and on the other hand, the thermal storage operation state takes zero in the case where the thermal storage operation is not performed. Further, the monitoring unit 130 calculates and monitors a power consumable amount of the electric water heater 113 by using an equation of [(1-electric water heater thermal storage operation state)×electric water heater rate power consumption amount].

The power demand state monitoring unit 132 monitors the total power consumption amount in the consumer, and may install a measurement instrument at a linkage point (note that the linkage point is positioned on the end side from a photovoltaic power generation facility linkage point) from a distribution system of the consumer, and monitor the total power consumption amount. Or, the monitoring unit 132 may collect the power consumption amount from the control apparatus of respective power load apparatus of the consumers and calculate the total power consumption amount.

The consumer result database 135 stores and manages daily result values of the photovoltaic power generation amount, total power consumption amount, battery charging/discharging amount, and hot-water demand amount of the consumer. The result values of the photovoltaic power generation amount, the total power consumption amount, and the battery charging/discharging amount are set to data of the amount at definite time intervals such as one hour and half hour, and the result values of the hot-water demand amount are set to data of the daily demand amount. The photovoltaic power generation state monitoring unit 127 stores the result values of the photovoltaic power generation amount, the power demand state monitoring unit 132 stores the result values of the total power consumption amount, and the battery state monitoring unit 128 stores the result values of the battery charging/discharging amount. The battery charging/discharging amount is managed with the charging set to plus and the discharging set to minus. In the hot-water demand amount, the total amount from a start of the thermal storage operation during a nighttime of the previous day until a start of the thermal storage operation during the nighttime of the current day is managed as the daily hot-water demand amount of the current day. The consumer result database 135 measures and totalizes the power consumption amount of a time zone corresponding to that of the electric water heater 113, and divides the totalized power consumption amount by an average COP of the electric water heater 113 to thereby calculate the hot-water demand amount. The average COP of the electric water heater 113 is previously given from an external device via the input and output unit 136, and is stored in and managed by the equipment specification data management unit 134. An internal unit of the electric water heater 113 manages the thermal storage amount, and the external device may use the data when being able to refer to data on the thermal storage amount.

The next day demand-and-supply prediction table data storage unit 133 stores the next day demand-and-supply prediction table data.

An example of the next day demand-and-supply prediction table data is illustrated in FIG. 4. The next day demand-and-supply prediction table data storage unit 133 associates and manages the next day demand-and-supply prediction table data with prediction values of the solar radiation intensity, photovoltaic power generation amount, power demand amount, demand-and-supply balance amount, photovoltaic power generation surplus power amount, and hot-water demand amount of plural time points of the next day. FIG. 4 illustrates an example by every hour, and for the purpose of simplifying the explanation, the case of the amount by every hour will be described below with reference to an example. The next day demand-and-supply prediction table data may be configured by every interval except one hour.

Suppose that data on the solar radiation intensity in the next day demand-and-supply prediction table data is given from the external device via the input and output unit 136 before starting the thermal storage operation during the nighttime of the previous day. For example, a user connects to the site of the weather report, and acquires data on the solar radiation intensity from data on the weather and temperature of the next day, and stores the data in the next day demand-and-supply prediction table data storage unit 133.

The photovoltaic power generation amount prediction unit 122 refers to the solar radiation intensity data of each time in the next day demand-and-supply prediction table data. Further, the prediction unit 122 reads out the photovoltaic power generation amount corresponding to the above-described solar radiation intensity on the photovoltaic power generation amount characteristic data, and outputs it to the next day demand-and-supply prediction table data as the photovoltaic power generation amount of the same time.

The power demand prediction unit 123 outputs a power demand amount prediction value of each time to the next day demand-and-supply prediction table data. For example, the power demand amount prediction value of each time is considered to be set to an average of the same time as that of the result data on the past power consumption amount. Here, the following is considered as a range to be averaged. That is, the entire past certain fixed period is simply set, or only the day matched with a section of weekday/holiday of the next day in the certain fixed period is set. Suppose that data on a reference period is previously given to the prediction unit 123 from the external device via the input and output unit 136.

The demand-and-supply balance prediction unit 124 outputs a demand-and-supply balance amount prediction value of each time to the next day demand-and-supply prediction table data. The prediction unit 124 calculates the demand-and-supply balance amount prediction value as a value acquired by subtracting the photovoltaic power generation amount prediction value from the power demand amount prediction value.

The photovoltaic power generation surplus power prediction unit 125 outputs a photovoltaic power generation surplus power amount prediction value of each time to the next day demand-and-supply prediction table data. The prediction unit 125 calculates the photovoltaic power generation surplus power amount prediction value as a value acquired by subtracting the demand-and-supply balance amount prediction value from the predetermined demand-and-supply balance reference value.

The hot-water demand prediction unit 126 outputs the hot-water demand amount prediction value of each time to the next day demand-and-supply prediction table data. For example, the following is considered. That is, an average of data values of the entire past certain fixed period is set based on the result data of the past daily hot-water demand amount. Or, an average of data values of only the days matched with a section of weekday/holiday of the next day is found out in the result data. Then, the average is set to the daily hot-water demand amount prediction value of the next day, and a value of one twenty fourth of the above-described prediction value is output as the hot-water demand amount prediction value of each time.

When the controller for local production for local consumption 121 receives a start signal for local production for local consumption from the user or the external apparatus via the input and output unit 136, the controller 121 transmits a start signal for suppressing a thermal storage operation of the electric water heater 113 to an electric water heater thermal storage controller 131 during the nighttime. On the other hand, during the daytime, the controller 121 periodically acquires the photovoltaic power generation amount from the photovoltaic power generation state monitoring unit 127, and further acquires the total power consumption amount from the power demand state monitoring unit 132. Then, the controller 121 subtracts the photovoltaic power generation facility power generation amount from the total power consumption amount, and sets the difference to the demand-and-supply balance amount. When the demand-and-supply balance amount is smaller than the demand-and-supply balance reference amount as a predetermined reference value, the controller 121 determines control contents for increasing the demand-and-supply balance amount by charging the battery 112 or starting the thermal storage operation of the electric water heater 113 such that the demand-and-supply balance amount becomes larger than the demand-and-supply balance reference amount. Based on the determination results, the controller 121 transmits a charging start signal for the battery 112 to the battery charging/discharging controller 129, and further transmits a thermal storage operation start signal for the electric water heater 113 to the electric water heater thermal storage controller 131, respectively. The charging start signal for the battery 112 includes the charging amount target value data, the thermal storage operation suppression signal includes the suppression rate data, and the thermal storage operation start signal includes the power consumption amount target value data. There will be described below details of the determination processing on the control contents for increasing the above-described demand-and-supply balance amount during the daytime. Further, the controller 121 performs the processings until receiving a stop signal for local production for local consumption from the user or the external apparatus via the input and output unit 136.

When receiving a battery charging start signal, the battery charging/discharging controller 129 transmits the battery charging start signal including the charging amount target value data to the controller of the battery 112.

When receiving the thermal storage operation suppression signal, the electric water heater thermal storage controller 131 transmits the thermal storage operation suppression signal including the suppression rate data to the controller of the electric water heater 113. Further, when receiving the thermal storage operation start signal, the controller 131 transmits the thermal storage operation start signal including the power consumption amount target value data to the controller of the electric water heater 113.

When receiving the battery charging start signal, the controller of the battery 112 performs charging by using charging power of the received charging amount target value data. Note that when the charging amount target value is larger than the rated charging power, the controller performs the charging by using the charging power of the rated charging power. Further, note that the controller performs the charging in the chargeable range as a charging capacity of the battery 112.

Normally, the controller of the electric water heater 113 previously performs the thermal storage operation at the predetermined time zone (hereinafter, referred to as a nighttime thermal storage time zone) during the nighttime and stores hot water in the hot water storage tank in preparation for a hot water demand of the next day. Further, when hot water is short on the next day, the controller additionally stores hot water (this is also referred to as a reheating operation). Here, to store hot water in the hot water storage tank is that a temperature of the hot water in the hot water storage tank is raised, and in addition, when the hot water amount in the hot water storage tank is reduced, water is fed and heated to thereby increase the hot water amount.

When receiving a thermal storage operation suppression and start signal from the consumer energy management apparatus 120, the controller of the electric water heater 113 performs control to suppress the thermal storage amount during the evening of the previous day by a given suppression rate than usual. The thermal storage suppression is performed by interrupting the thermal storage operation before termination conditions of the normal thermal storage operation are realized. For example, when a value of the index as a reference of the thermal storage operation termination conditions (thermal storage operation termination reference index) satisfies the following conditions, the controller may interrupt the thermal storage operation. Or, in the case where a plurality of thermal storage operation termination reference indexes are present, when at least one value of the thermal storage operation termination reference indexes satisfies the following conditions, the controller may interrupt the thermal storage operation. There is the possibility that the thermal storage operation termination reference indexes are different from each other also depending on the electric water heater. For example, the thermal storage duration, the time, and the temperature sensor value in the hot water storage tank are considered as the thermal storage operation termination reference index.

$$|Xi - Xi(s)| \leq |Xi(e) - Xi(s)| \times (1.0 - R/100)$$

on condition that

Xi: a present value of the thermal storage operation termination reference index i, Xi(s): a value at the time of starting the thermal storage operation of the thermal storage operation termination reference index i, Xi(e): a value of the thermal storage operation termination conditions of the thermal storage operation termination reference index i, and R: a value [%] of the suppression rate data received from the consumer energy management apparatus Further, when receiving the thermal storage operation start signal from the consumer energy management apparatus, the controller of the electric water heater 113 performs control to start the thermal storage operation during the daytime of the current day. The thermal storage operation is performed by starting the reheating operation as the thermal storage operation normally performed at the time when hot water is short during the daytime. When the reheating operation termination conditions are realized, the thermal storage operation is terminated.

A calculation on the suppression rate for suppressing the thermal storage operation during the nighttime in the controller for local production for local consumption 121 is performed as follows. A process flow is illustrated in a flowchart of FIG. 5.

First, the controller 121 calculates the total next day photovoltaic power generation surplus power amount (step S11). Here, the controller 121 totalizes the photovoltaic power generation surplus power amount prediction values of each time of the next day demand-and-supply prediction table data, and sets the totalized value to the total next day photovoltaic power generation surplus power amount.

Then, the controller 121 determines whether the total next day photovoltaic power generation surplus power amount is larger than zero (step S12).

As a result of the determination of step S2, when the total next day photovoltaic power generation surplus power amount is equal to zero, the controller for local production for local consumption 121 sets the suppression rate for suppressing the nighttime thermal storage operation to 0 [%] (step S13).

Further, as a result of the determination of step S2, when the total next day photovoltaic power generation surplus power amount is larger than zero, the controller 121 calculates the hot water reduction amount of each time of the daytime zone (step S14).

Here, all the time zones except the nighttime thermal storage time zone of the next day demand-and-supply prediction table data are first called as the daytime zone, and a start time of the daytime zone is set to TDs and a termination time thereof is set to TDe.

The hot water reduction amount $\Delta HW(t)$ of each time t of the daytime zone is calculated by using the following equation.

$$\Delta HW(t)=DHW(t)-GPV(t)/COP$$

on condition that

DHW(t): Hot water demand amount of time t,

GPV(t): Photovoltaic power generation amount of time t, and

COP: Average COP of electric water heater

The necessary residual hot water amount MHW(t) of each time t of the daytime zone is calculated by using the following recurrence equation (step S15).

$$MHW(t)=\max\{0, MHW(t+1)-\Delta HW(t)\} \text{ for } TDs \leq t \leq TDe$$

$$MHW(Te+1)=0$$

Here, +1 of MHW(t+1) means a processing for the time as the next reference with respect to the time t, and one hour is added to the time t in this example.

Further, the suppression rate for suppressing the nighttime thermal storage operation is calculated by using the following equation (step S16).

Suppression rate=$MHW(Ts)$/next day daily hot water demand amount prediction value×100 [%]

As can be seen from the above sequence, the suppression rate for suppressing the nighttime thermal storage operation of the controller for local production for local consumption 121 is calculated.

Figure 6:
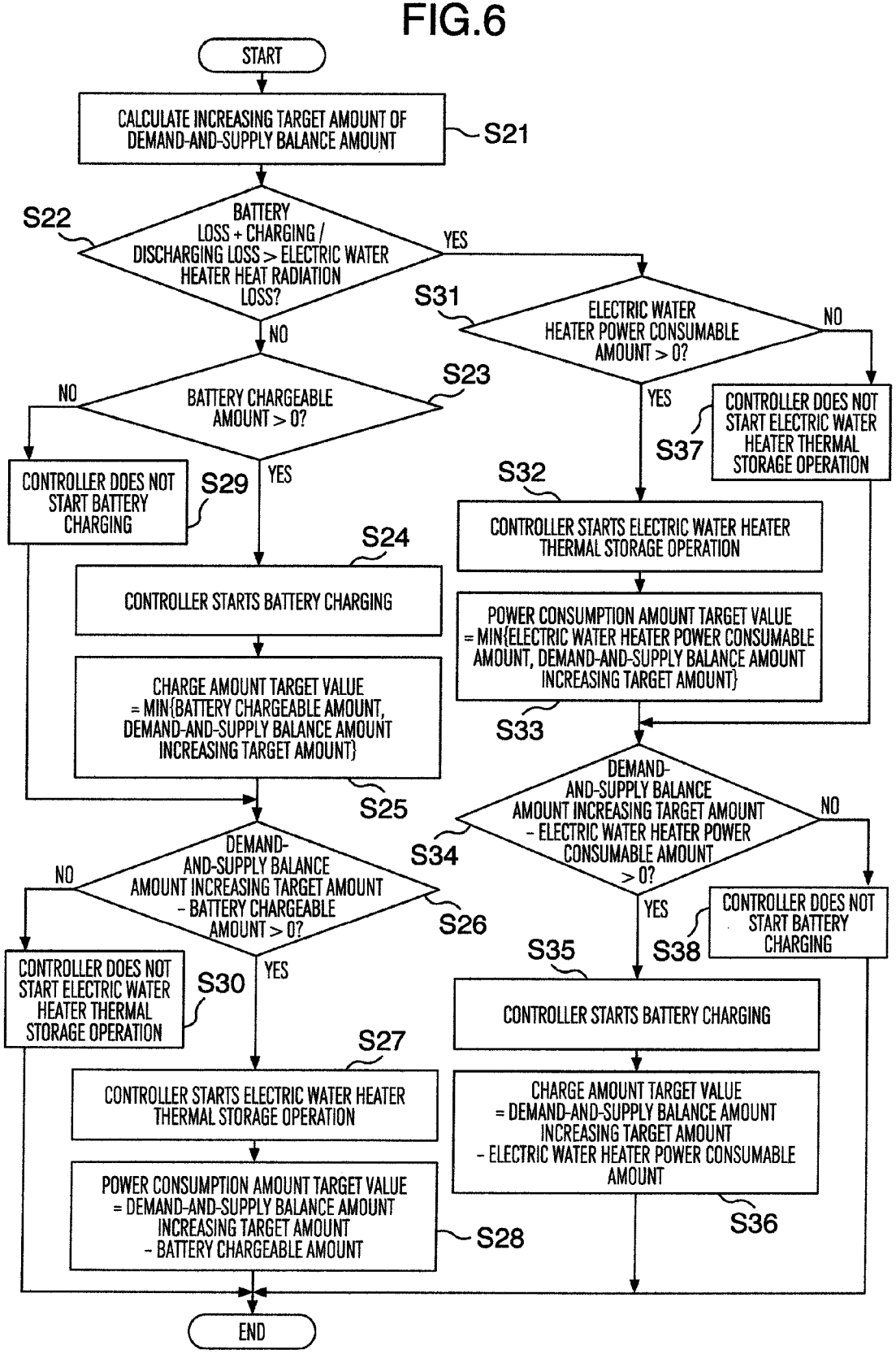
FIG. 6 is a flowchart illustrating a process flow for determining control contents for increasing a daytime demand-and-supply balance amount of the system according to the first embodiment of the present invention.

The determination processing of control contents for increasing the demand-and-supply balance amount during the daytime of the controller for local production for local consumption 121 is performed in a process illustrated in a flowchart of FIG. 6.

When providing an explanation according to the flowchart of FIG. 6, the controller 121 first calculates the increasing target amount of the demand-and-supply balance amount (step S21).

Here, the controller 121 acquires the photovoltaic power generation amount from the photovoltaic power generation state monitoring unit 127, and further acquires the total power consumption amount from the power demand state monitoring unit 132 to thereby calculate the demand-and-supply balance amount as described above. Then, the controller 121 sets a value acquired by subtracting the demand-and-supply balance amount from the demand-and-supply balance reference amount to the increasing target amount of the demand-and-supply balance amount.

Next, the controller for local production for local consumption 121 goes to step S22, and determines priorities of the battery charging start and the electric water heater thermal storage operation start.

Here, the controller 121 acquires data on the rated output, battery loss, and charging/discharging loss of the battery 112, and data on the heat radiation loss of the electric water heater 113 from the equipment specification data management unit 134.

Further, the controller 121 acquires a present value of the chargeable amount of the battery 112 from the battery state monitoring unit 128, and further acquires a present value of the power consumable amount of the electric water heater 113 from the electric water heater state monitoring unit 130.

Then, the controller 121 compares a value acquired by totalizing the battery loss and charging/discharging loss of the battery 112 with a value of the heat radiation loss of the electric water heater 113. If the former is smaller than the latter, the controller 121 gives priority to the battery charging start. On the other hand, if the former is larger than the latter, the controller 121 gives priority to the electric water heater thermal storage operation start.

In addition, the above-described comparison and determination of step S22 may be changed based on a state of operating the system. The priority may be determined, for example, in consideration of operational statuses such as an outdoor air temperature and humidity. Specifically, for example, if the outdoor air temperature is lower than a reference temperature, the heat radiation loss of the electric water heater 113 may be changed larger than the reference value. If the outdoor air temperature is higher than the reference temperature, the heat radiation loss of the electric water heater 113 may be changed smaller than the reference value. Then, the above-described totalized value may be compared with the changed heat radiation loss value.

Also, the battery loss and charging/discharging loss of the battery 112 may be changed. For example, based on operational statuses such as a period or the number of times of charging/discharging after installing the battery 112, when deterioration of the battery 112 has been progressed, the battery loss or the charging/discharging loss may be increased.

When giving priority to the electric water heater thermal storage operation start in step S22, the controller for local production for local consumption 121 determines whether "the electric water heater power consumable amount>0" (step S31).

Here, if "the electric water heater power consumable amount=0", the controller 121 does not start the thermal storage operation of the electric water heater 113 (step S37).

On the other hand, if "the electric water heater power consumable amount>0", the controller 121 starts the thermal storage operation of the electric water heater 113 (step S32). The controller 121 sets the power consumption amount target value to a smaller value of the electric water heater power consumable amount and the demand-and-supply balance amount increasing target amount (step S33).

Thereafter, the controller 121 determines whether "the demand-and-supply balance amount increasing target amount−the power consumption amount target value>0" (step S34). If "the demand-and-supply balance amount increasing target amount−the power consumption amount target value>0", the controller 121 starts the battery charging operation 112 (step S35). The controller 121 sets the charge amount target value to a value of "the demand-and-supply balance amount increasing target amount−the power consumption amount target value" (step S36).

If "the demand-and-supply balance amount increasing target amount−the power consumption amount target value=0" in step S34, the controller 121 goes to step S38, and does not start to charge the battery 112.

Next, the process of the case where the controller for local production for local consumption 121 gives priority to the battery charging start in step S22 will be described.

At this time, the controller 121 determines whether "the battery chargeable amount>0" (step S23). Here, if "the battery chargeable amount=0", the controller 121 does not start to charge the battery 112 (step S29).

If "the battery chargeable amount>0", the controller 121 starts the battery charging operation 112 (step S24). The controller 121 sets the charge amount target value to a smaller value of the battery chargeable amount and the demand-and-supply balance amount increasing target amount (step S25).

Thereafter, the controller 121 determines whether "the demand-and-supply balance amount increasing target amount−the charging amount target value>0" (step S26). If "the demand-and-supply balance amount increasing target amount−the charging amount target value>0", the controller 121 starts the thermal storage operation of the electric water heater 113 (step S27). The controller 121 sets the power consumption amount target value to a value of "the demand-and-supply balance amount increasing target amount−the charge amount target value" (step S28).

As can be seen from the above sequence, when the consumer energy management apparatus 120 and the electric water heater 113 operate in a coordinated manner, the electric water heater 113 on the consumer end performs control to consume the photovoltaic power generation surplus power.

Figure 8:
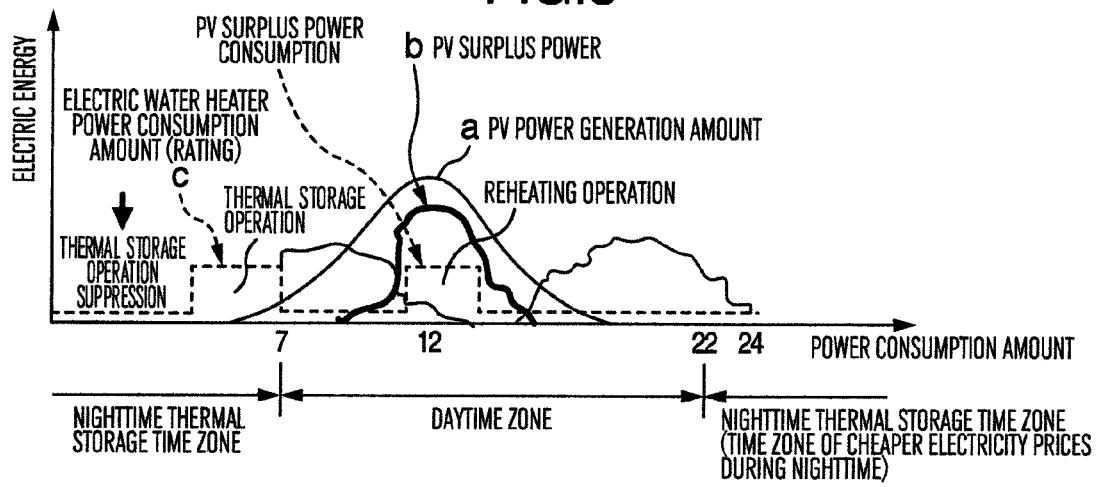
FIG. 8 is a characteristic diagram illustrating one example of a surplus power consumption state according to the first embodiment of the present invention.

FIGS. 7A, 7B, and 8 illustrate an example of state where local production of the photovoltaic generated power for local consumption is performed in the system configuration according to the present embodiment.

FIG. 7A illustrates integration values of the heat supply amount for storing heat of the electric water heater 113 through the time change of one day. A characteristic P1 is illustrated in an example of the case where the photovoltaic power generation is not used for a boiling-up operation. In this case, the boiling-up operation is completed during the nighttime (until 7 a.m. in this example), and is not performed until midnight. On the other hand, in a characteristic P2 of the case of this example, the boiling-up operation is performed by using nighttime power until the previous thermal storage target amount at the time of local production of photovoltaic generated power for local consumption. Thereafter, the boiling-up operation is performed during the daytime by using the photovoltaic power generation surplus power, and the characteristic P2 reaches a normal previous thermal storage target amount.

In addition, in a characteristic P3, the photovoltaic power generation surplus power is larger than predicted power. In this case, when the characteristic P3 reaches the normal previous thermal storage target amount, the photovoltaic power generation surplus power is not consumed any more. On the contrary, in a characteristic P4, the photovoltaic power generation surplus power is smaller than predicted power. In this case, since the thermal storage amount is smaller than the normal previous thermal storage target amount, the thermal storage operation is performed by using daytime power relatively more expensive compared to the nighttime power.

FIG. 7B is a diagram viewed through the residual thermal storage amount of the hot water storage tank of the electric water heater 113. A certain reference is set with respect to a heat amount of a hot water in the hot water storage tank, and the residual thermal storage amount is set to a difference from the reference. In a characteristic H1 of the case of this example, the photovoltaic power generation is not used for the boiling-up operation. In this case, the boiling-up operation is completed during the nighttime, and the characteristic H1 reaches the normal thermal storage target value. Thereafter, until the boiling-up operation is started at midnight, the residual hot water amount is simply reduced.

On the other hand, in a characteristic H2 of the case of this example, the boiling-up operation is performed by using the nighttime power until the previous thermal storage target amount at the time of local production of the photovoltaic generated power for local consumption. Thereafter, the boiling-up operation is performed by using the photovoltaic power generation, and the hot water is consumed. At the time of the nighttime when the photovoltaic power generation is not performed, the residual hot water amount of the characteristic H2 is the same as that of the characteristic H1 in which the photovoltaic power generation is not used.

FIG. 8 illustrates a consumption state of the photovoltaic power generation surplus power by use of the electric water heater 113. In FIG. 8, the vertical axis represents the power amount, and the horizontal axis represents the time.

A characteristic "a" illustrated in FIG. 8 represents the photovoltaic power generation amount, and a characteristic "b" represents the photovoltaic power generation surplus power. A characteristic "c" in a broken line represents the power consumption amount of the electric water heater 113, and the reheating operation is performed during the daytime in addition to the thermal storage operation during the nighttime.

In addition, FIGS. 7A, 7B, and 8 illustrate a relationship between the photovoltaic power generation facilities and the electric water heater. Also in the battery, the charging operation is performed under conditions illustrated in the flowchart of FIG. 6, and the charged power is discharged during the nighttime.

In the daytime thermal storage operation thus far described of the electric water heater 113, the controller of the electric water heater 113 controls the number of revolutions of a compressor. When the controller has a function capable of suppressing and controlling as a target value the power consumption amount during the reheating operation of the electric water heater 113, the electric water heater 113 may perform the reheating operation by using the power consumption amount target value received by the consumer energy management apparatus. Through the above-described configuration, during the reheating operation of the electric water heater 113, the controller can suppress an amount in which the power consumption amount of the electric water heater 113 is larger than the photovoltaic power generation surplus power amount.

In the above-described configuration, the controller of the electric water heater 113 receives the thermal storage operation suppression start signal and the suppression rate from the consumer energy management apparatus 120. Further, the controller of the electric water heater 113 adjusts a criterion of the thermal storage operation termination condition according to the suppression rate. The above-described process permits the controller to control the thermal storage operation suppression of the electric water heater 113 for local production for local consumption. Further, the energy management system may have the following configuration. Specifically, the electric water heater thermal storage controller 131 of the consumer energy management apparatus 120 acquires the thermal storage operation termination reference index type and data on its reference values as the thermal storage operation termination condition data, and periodically acquires the present values of its indexes from the controller of the electric water heater 113. When at least one value of the thermal storage operation termination reference indexes satisfies the following conditions, the electric water heater thermal storage controller 131 of the consumer energy management apparatus 120 determines to interrupt the thermal storage operation, and turns off a conductive state of the electric water heater 113. As a result, the thermal storage operation of the electric water heater 113 may be interrupted from the external device.

$$|Xi-Xi(s)| \leq |Xi(e)-Xi(s)| \times (1.0-R/100)$$

on condition that

Xi: a present value of the thermal storage operation termination reference index i, Xi(s): a value at the time of starting the thermal storage operation of the thermal storage operation termination reference index i, Xi(e): a value of the thermal storage operation termination condition of the thermal storage operation termination reference index i, and R: a value [%] of the suppression rate data Further, in the above-described configuration, a value on the suppression rate of the thermal storage operation suppression during the nighttime of the previous day is previously set by the user, and further may be determined by any one of two methods described below.

(1) Consequence type of photovoltaic power generation surplus power

The process is performed setting the suppression rate to 0 [%].

The above-described process method is intended to avoid a risk of decreasing the photovoltaic power generation amount during the daytime of the next day.

When using the process method, the thermal storage operation during the nighttime of the previous day is normally performed. Therefore, also when the photovoltaic power generation surplus power during the daytime of the next day is reduced as compared to expectations, a risk of increasing the consumption amount of the daytime power relatively more expensive than the nighttime power can be avoided by controlling the local production for local consumption.

On the other hand, since the thermal storage amount of the hot water storage tank is present like a normal operation, the thermal storable amount and power consumption amount based on the reheating operation during the daytime of the next day might be restricted, and the consumption amount of the photovoltaic power generation surplus power might be reduced. In that case, there is the possibility of decreasing an effect, as an object of the local production for local consumption, of increase in the photovoltaic power generation amount or reduction in an impact on a system operation of the photovoltaic power generation facilities.

(2) Maximization type of use of photovoltaic power generation surplus power

The process is performed setting the suppression rate to 100 [%].

The above-described process method is intended to maximally consume the photovoltaic power generation amount during the daytime of the next day.

When using the process method, the thermal storage operation during the nighttime of the previous day is not performed. Therefore, the thermal storage amount of the hot water storage tank can be minimized, and the thermal storable amount and power consumption amount based on the reheating operation during the daytime of the next day can be maximized. Also when the photovoltaic power generation surplus power during the daytime of the next day is large as compared to expectations, an allowance for consuming it can be secured.

On the other hand, there is the possibility that since the thermal storage amount of the hot water storage tank is small, the photovoltaic power generation amount is short due to the hot water demand, and therefore the consumption amount of the daytime power relatively more expensive than the nighttime power increases.

2. Second Embodiment

Figure 9:
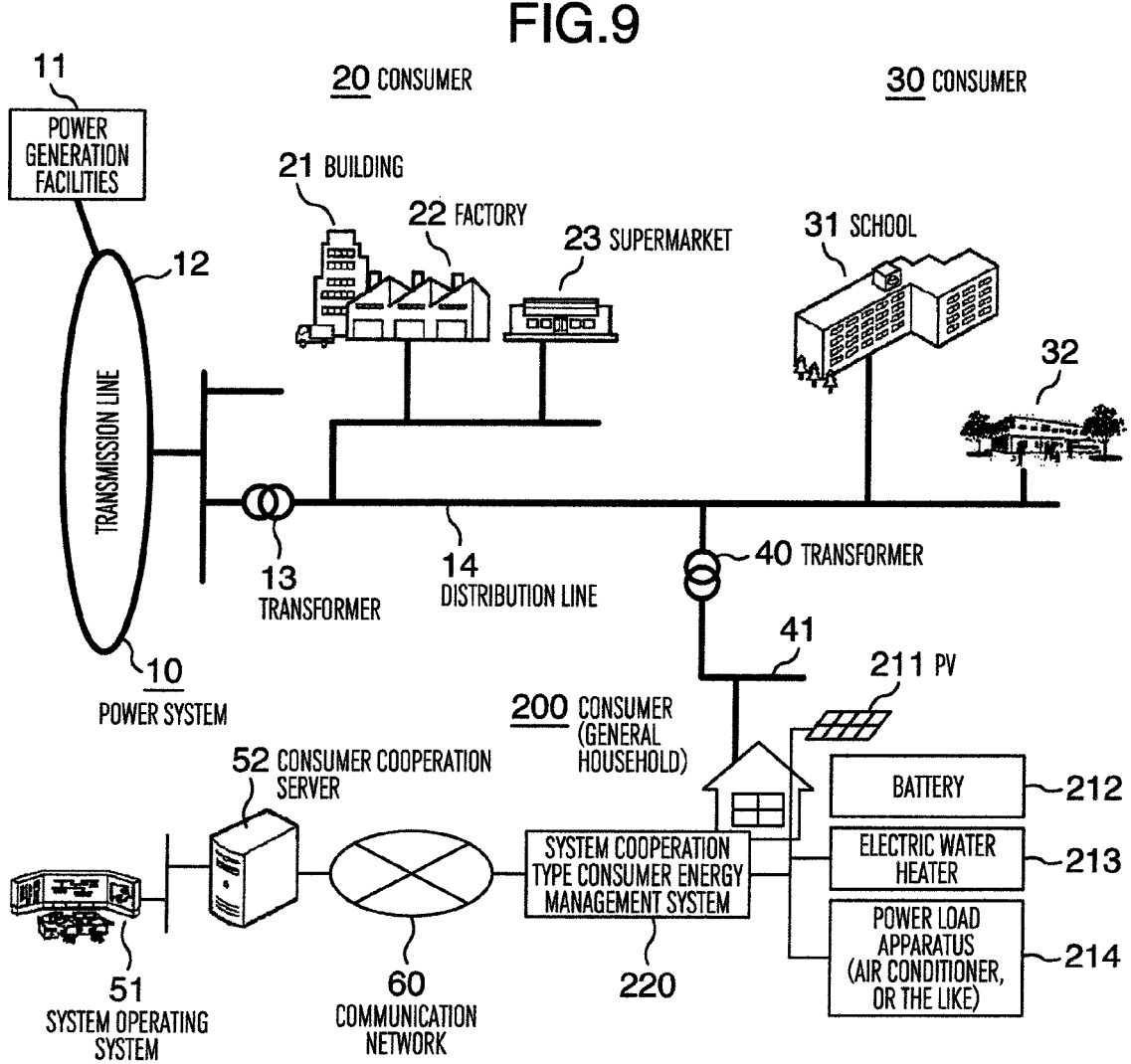
FIG. 9 illustrates the entire configuration example of a system according to a second embodiment of the present invention.
Figure 10:
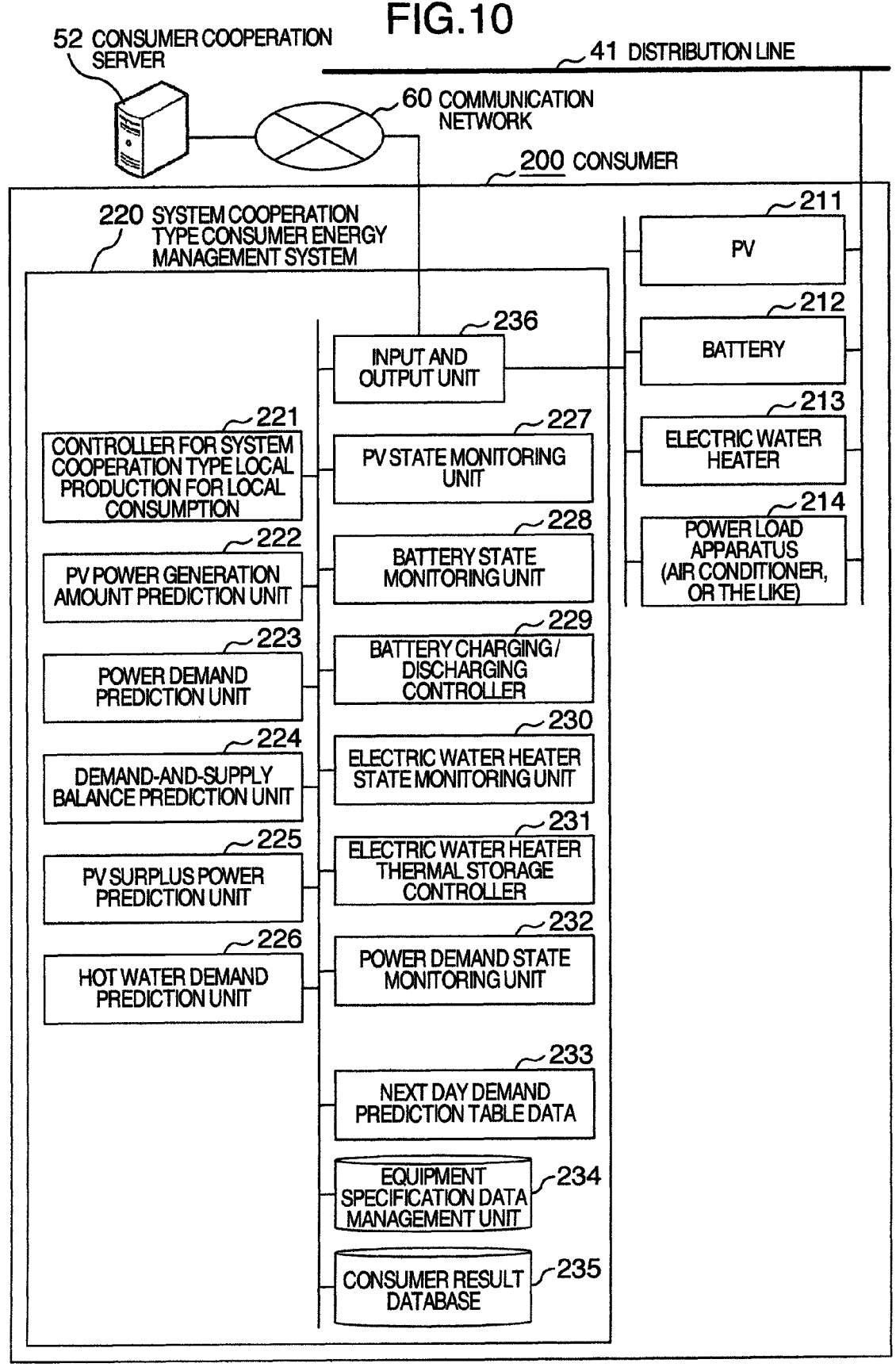
FIG. 10 is a functional block diagram illustrating a configuration example of a consumer energy management apparatus of the system according to the second embodiment of the present invention.

Next, the energy management system according to a second embodiment of the present invention will be described with reference to FIGS. 9 and 10. In FIGS. 9 and 10, the same circuit elements as those of FIGS. 1 to 8 in the first embodiment are indicated by the same reference numerals as those of FIGS. 1 to 8 in the first embodiment.

In an example according to the second example, an operating system for system cooperation type local production for local consumption is illustrated such that the consumer energy management apparatus operates in cooperation with a system operating system of a power system.

FIG. 9 illustrates the entire system configuration example according to the present embodiment. To the configuration illustrated in FIG. 1, a system operating system 51 and a consumer cooperation server 52 are added. The consumer energy management apparatus is changed into a system cooperation type consumer energy management apparatus 220. The consumer cooperation server 52 is connected to the system operating system 51 and the system cooperation type consumer energy management apparatus 220 via a communication network 60.

The system operating system 51 monitors a power system state and performs various controls for supplying power to consumers with high efficiency and stability. Specifically, the system operating system 51 performs demand-and-supply control for adjusting an output of each generator so as to balance the total demand amount and total power generation amount of the entire power system for the purpose of keeping a voltage at each point of a distribution system within a specified range, and keeping distribution control for operating various voltage adjustment devices of the distribution system and frequency in a power system within a specified range. Further, the system operating system 51 predicts a power system state of the next day by using state monitoring data of the power system. The predicted power system state includes the demand amount and voltage state at each point of the distribution system, and states of the total demand amount and total power generation amount of the entire power system.

The consumer cooperation server 52 acquires predicted results of a power system state of the next day from the system operating system 51, and extracts a demand prediction value and voltage prediction value at a network connection point of the consumer 200 having installed therein the system cooperation type consumer energy management apparatus 220. Further, the consumer cooperation server 52 acquires the next day demand-and-supply balance amount prediction value from the consumer energy management apparatus 220, and subtracts the demand-and-supply balance amount prediction value from the demand prediction value to thereby set its difference value to the demand amount increasing target value. Note, however, that when the demand amount increasing target value becomes negative, zero is substituted for it. Further, when the voltage prediction value is present in a specific amount of a predetermined range from the upper limit of the specified range and further the demand amount increasing target value is larger than zero, the consumer cooperation server 52 transmits a start signal for system cooperation type local production for local consumption to the system cooperation type consumer energy management apparatus 220. The start signal for system cooperation type local production for local consumption includes the demand amount increasing target value.

The consumer 200 has the photovoltaic power generation facilities 211 as a facility for receiving solar light to convert it into power, the battery 212 as a facility for storing and taking out electricity, the electric water heater 213 as a facility for heating water and generating hot water by using electricity to store it in a hot water storage tank, and the power load apparatus 214.

In addition to the function of the consumer energy management apparatus 120 described in the first embodiment, the system cooperation type consumer energy management apparatus 220 receives a start signal for local production for local consumption from the consumer cooperation server 52 via the input and output unit 236, and controls apparatus in the consumer 200 according to the start signal for local production for local consumption.

FIG. 10 is a functional block diagram illustrating the system cooperation type consumer energy management apparatus 220. The system cooperation type consumer energy management apparatus 220 has a controller for system cooperation type local production for local consumption 221 in place of the controller for local production for local consumption 121 of the consumer energy management apparatus 120 in FIG. 2.

A configuration of the system cooperation type consumer energy management apparatus 220 will be simply described. The apparatus 220 includes the controller for system cooperation type local production for local consumption 221, a photovoltaic power generation amount prediction unit 222, a power demand prediction unit 223, a demand balance prediction unit 224, a photovoltaic power generation surplus power prediction unit 225, and a hot-water demand prediction unit 226. Further, the apparatus 220 includes a photovoltaic power generation state monitoring unit 227, a battery state monitoring unit 228, a battery charging/discharging controller 229, an electric water heater state monitoring unit 230, an electric water heater thermal storage controller 231, a power demand state monitoring unit 232, a next day demand prediction table data storage unit 233, an equipment specification data management unit 234, a consumer result database 235, and an input and output unit 26.

In each unit with the same name as that of each unit of the consumer energy management apparatus 120 described in the first embodiment, the same processing as that of each unit described in the first embodiment is basically performed, and therefore, detailed descriptions will be here omitted.

Further, the controller for system cooperation type local production for local consumption 221 being a feature of the present embodiment will be described. When receiving any one or both of a start signal for system cooperation type local production for local consumption and a control start signal for local production for local consumption via the input and output unit 236, the controller 221 performs the following processings until receiving a stop signal again. That is, during the nighttime, the controller 221 transmits a start signal for suppressing the thermal storage operation of the electric water heater 213 to the electric water heater thermal storage controller 231. This start signal for suppressing the thermal storage operation includes suppression rate data, and a value of the suppression rate is set by using the same processing as that of the first embodiment. Further, during the daytime, the controller 221 performs the following processings according to the reception conditions of the start signal for system cooperation type local production for local consumption and the control start signal for local production for local consumption.

(1) Initialization

All values of the demand-and-supply balance amount increasing target amount 1, the demand-and-supply balance amount increasing target amount 2, and the demand-and-supply balance amount increasing target amount 3 are set to zero.

(2) Calculation of the demand-and-supply balance amount increasing target amount 1 at the time of performing the control for local production for local consumption Periodically, the controller 221 acquires the photovoltaic power generation amount from the photovoltaic power generation state monitoring unit 227, and further acquires the total power consumption amount from the power demand state monitoring unit 232. Then, the controller 221 sets a value acquired by subtracting the photovoltaic power generation amount from the total power consumption amount to the demand-and-supply balance amount. Further, the controller 221 sets a value acquired by subtracting the above-described demand-and-supply balance amount from the predetermined demand-and-supply balance reference amount to the demand-and-supply balance amount increasing target amount 1.

(3) Calculation of the demand-and-supply balance amount increasing target amount 2 at the time of performing the control for system cooperation type local production for local consumption The controller 221 sets the demand amount increasing target value received from the consumer cooperation server 52 via the input and output unit 236 to the demand-and-supply balance amount increasing target amount 2.

(4) Determination of the demand-and-supply balance amount increasing target amount The controller 221 compares the demand-and-supply balance amount increasing target amount 1 and 2 calculated at the items (1), (2), and (3), and further determines a larger value to be the demand-and-supply balance amount increasing target amount.

(5) Determination of priority of battery charging start and electric water heater thermal storage operation start The controller 221 acquires data on the rated output, battery loss, and charging/discharging loss of the battery 212, and data on the heat radiation loss of the electric water heater 213 from the equipment specification data management unit 234.

The controller 221 acquires the present value of the chargeable amount of the battery 212 from the battery state monitoring unit 228, and further acquires the present value of the power consumable amount of the electric water heater 213 from the electric water heater state monitoring unit 230.

The controller 221 compares a value acquired by totalizing the battery loss and the charging/discharging loss of the battery 212, and a value of the heat radiation loss of the electric water heater 213. If the former is smaller than the latter, the controller 221 gives priority to the battery charging start. If the former is larger than the latter, the controller 221 gives priority to the electric water heater thermal storage operation start.

(6) Processing of the case where priority is given to the electric water heater thermal storage operation start If "the electric water heater power consumable amount=0", the controller 221 does not start the thermal storage operation of the electric water heater 213.

If "the electric water heater power consumable amount>0", the controller 221 starts the thermal storage operation of the electric water heater 213, and further sets the power consumption amount target value to the demand-and-supply balance amount increasing target amount.

Further, if "the demand-and-supply balance amount increasing target amount−the electric water heater power consumable amount>0", the controller 221 starts the battery charging operation, and further sets the charge amount target value to a value of "the demand-and-supply balance amount increasing target amount−the electric water heater power consumable amount".

(7) Processing of the case where priority is given to the battery charging start If "the battery chargeable amount=0", the controller 221 does not start the battery charging operation.

If "the battery chargeable amount>0", the controller 221 starts the battery charging operation, and further sets the charge amount target value to the demand-and-supply balance amount increasing target amount.

Further, if "the demand-and-supply balance amount increasing target amount−the battery chargeable amount>0", the controller 221 starts the thermal storage operation of the electric water heater 213, and further sets the power consumption amount target value to a value of "the demand-and-supply balance amount increasing target amount−the battery chargeable amount".

As can be seen from the above sequence, the consumer energy management apparatus is changed into the operation system for system cooperation type local production for local consumption. The proposed system cooperation type consumer energy management apparatus can absolutely avoid the photovoltaic power generation on the consumer end from the suppression based on system states of a voltage, and increase the power generation amount. Further, the system cooperation type consumer energy management apparatus can generate and consume power with high efficiency and low carbon emissions.

3. Third Embodiment

Next, the energy management system according to a third embodiment of the present invention will be described with reference to FIGS. 11 to 14. In FIGS. 11 to 14, the same circuit elements as those of FIGS. 1 to 10 in the first and second embodiments are indicated by the same reference numerals as those of FIGS. 1 to 10 in the first and second embodiments.

In an example according to the third example, an operating system for community local production for local consumption is illustrated such that the consumer energy management apparatus operates cooperatively among a plurality of consumers.

Figure 11:
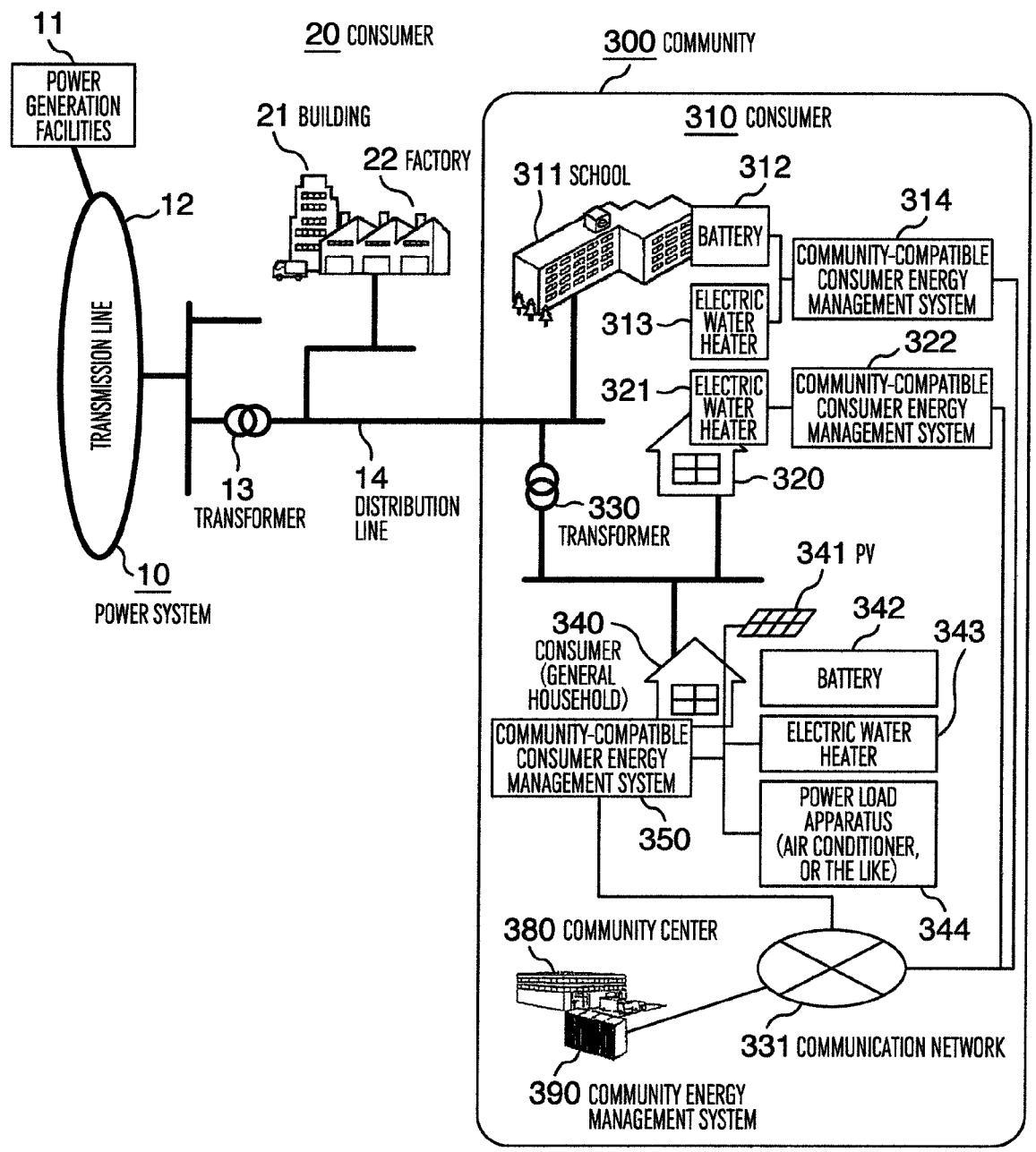
FIG. 11 illustrates the entire configuration example of a system according to a third embodiment of the present invention.

FIG. 11 illustrates the entire system configuration example according to the present embodiment. To the configuration of FIG. 1, a community energy management apparatus 390 is added, and the consumer energy management apparatus is changed into a community-compatible consumer energy management apparatus 350. The community energy management apparatus 390 is an energy management apparatus installed in a community center 380, and is connected to the community-compatible consumer energy management apparatus 314, 322, and 350 of a plurality of consumers within an area via a communication network 331, and is an apparatus which controls their cooperative operation. The community-compatible consumer energy management apparatus 314 is an energy management apparatus installed in a consumer 310 (school 311), and controls a battery 312 and an electric water heater 313. The energy management apparatus 322 is an energy management apparatus of a consumer 320 having an electric water heater 321 (having no photovoltaic power generation facilities).

In addition to the functions of the consumer energy management apparatus 120 described in the first embodiment, the community-compatible consumer energy management apparatus 350 provided on the consumer 340 has a function of controlling apparatus of the consumer 340 according to control signals from the community energy management apparatus 390. The consumer 340 is a consumer having installed therein all of a battery 342, an electric water heater 343, and photovoltaic power generation facilities 342.

Figure 12:
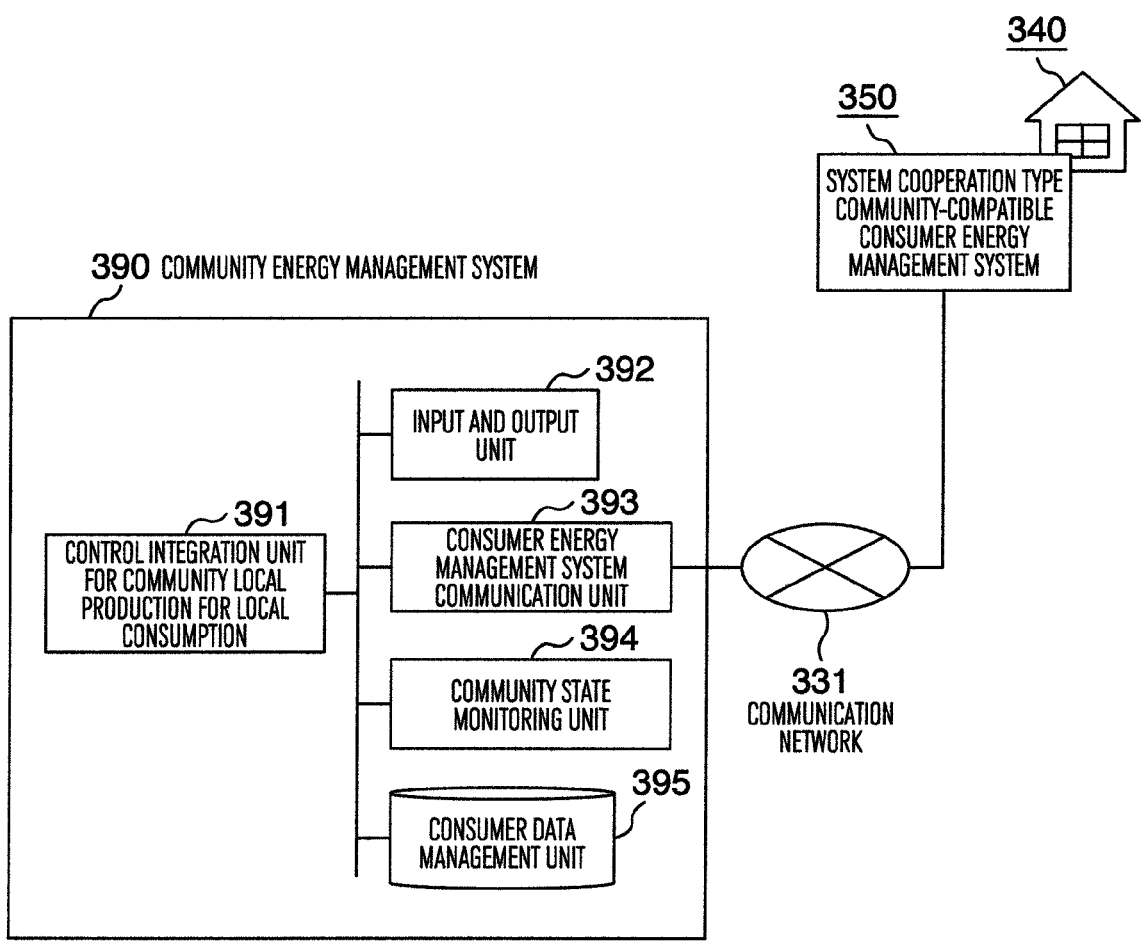
FIG. 12 is a functional block diagram illustrating a configuration example of a community energy management apparatus of the system according to the third embodiment of the present invention.

FIG. 12 is a functional block diagram illustrating the community energy management apparatus 390 installed in the community center 380. The community energy management apparatus 390 is configured by an input and output unit 392, a consumer energy management apparatus communication unit 393, a consumer data management unit 395, a community state monitoring unit 394, and a controller for community local production for local consumption 391.

The input and output unit 392 is an external interface in which the user or the external apparatus inputs data and which outputs data to the user or the external apparatus.

The consumer energy management apparatus communication unit 393 controls communication for exchanging data with individual consumer energy management apparatus through the community energy management apparatus 390.

The consumer data management unit 395 stores and manages information on installation conditions or specification data of each device on the consumer end, given from the user or the external apparatus via the input and output unit 392. In addition, the management unit 395 accesses each community-compatible consumer energy management apparatus 350 within an area via the consumer energy management apparatus communication unit 393 as needed. Further, the management unit 395 collects data on operational conditions of each device on the consumer end or control conditions for local production for local consumption based on the consumer energy management apparatus 350, and stores and manages their data. Specification data on the devices on the consumer end includes specification data on the photovoltaic power generation facilities, battery, and electric water heater described in the first embodiment.

The community state monitoring unit 394 monitors a demand-and-supply balance state in the community. The monitoring unit 394 collects and totalizes the demand-and-supply balance amount of the consumer from the community-compatible consumer energy management apparatus of the consumer, and calculates the total amount as the total demand-and-supply balance amount in the community.

When receiving a start signal for community local production for local consumption from the user or the external apparatus via the input and output unit, the controller for community local production for local consumption 391 periodically acquires data on the total demand-and-supply balance amount in the community from the community state monitoring unit during the daytime. When the total demand-and-supply balance amount in the community is smaller than the total demand-and-supply balance reference amount in the community as a predetermined reference value, the controller 391 calculates the presence or absence for starting a control for community local production for local consumption in each consumer, and its adjustment amount. Further, the controller 391 transmits a control start signal for community local production for local consumption to the community-compatible consumer energy management apparatus 350 of each consumer determined as a control start for local production for local consumption via the consumer energy management apparatus communication unit. The control start signal for community local production for local consumption includes the adjustment amount data for each consumer.

The consumer to be started of a control for the community local production for local consumption and a calculation processing of the adjustment amount will be described below.

(1) Calculation of photovoltaic power generation surplus power amount in the community The controller 391 subtracts the total demand-and-supply balance amount in the community from the total demand-and-supply balance reference amount in the community, and sets the difference to the photovoltaic power generation surplus power amount in the community.

(2) Collection of each consumer data

The controller 391 acquires the present electric water heater power consumable amount data, average COP data as an equipment specification value of the electric water heater, and average heat radiation loss data of each consumer in the community from the consumer data management unit 395.

(3) Determination of the consumer to be started of a control for the community local production for local consumption and a calculation processing of the adjustment amount The controller 391 selects in order the consumer with a larger average COP of the electric water heater as a consumer to be started, totalizes the electric water heater power consumable amount, and terminates the selection when the totalized amount is larger than the photovoltaic power generation surplus power amount in the community.

The controller 391 sets the adjustment amount of the selected consumers by using the respective electric water heater power consumable amount.

However, the controller 391 subtracts the amount by which the totalized value of the electric water heater power consumable amount is larger than the photovoltaic power generation surplus power amount in the community from the adjustment amount of the finally-selected consumer.

In the selection of the consumers in the above-described processing of (3), the consumer to be started may be selected in order from a consumer with a larger value of average COP×average heat radiation loss of the electric water heater. In this case, the heat radiation loss at the time of storing longer than usual hot water for storing heat more than usual on the consumer end can be reduced in the entire community, and as a result, energy efficiency in the entire community can be improved.

Figure 13:
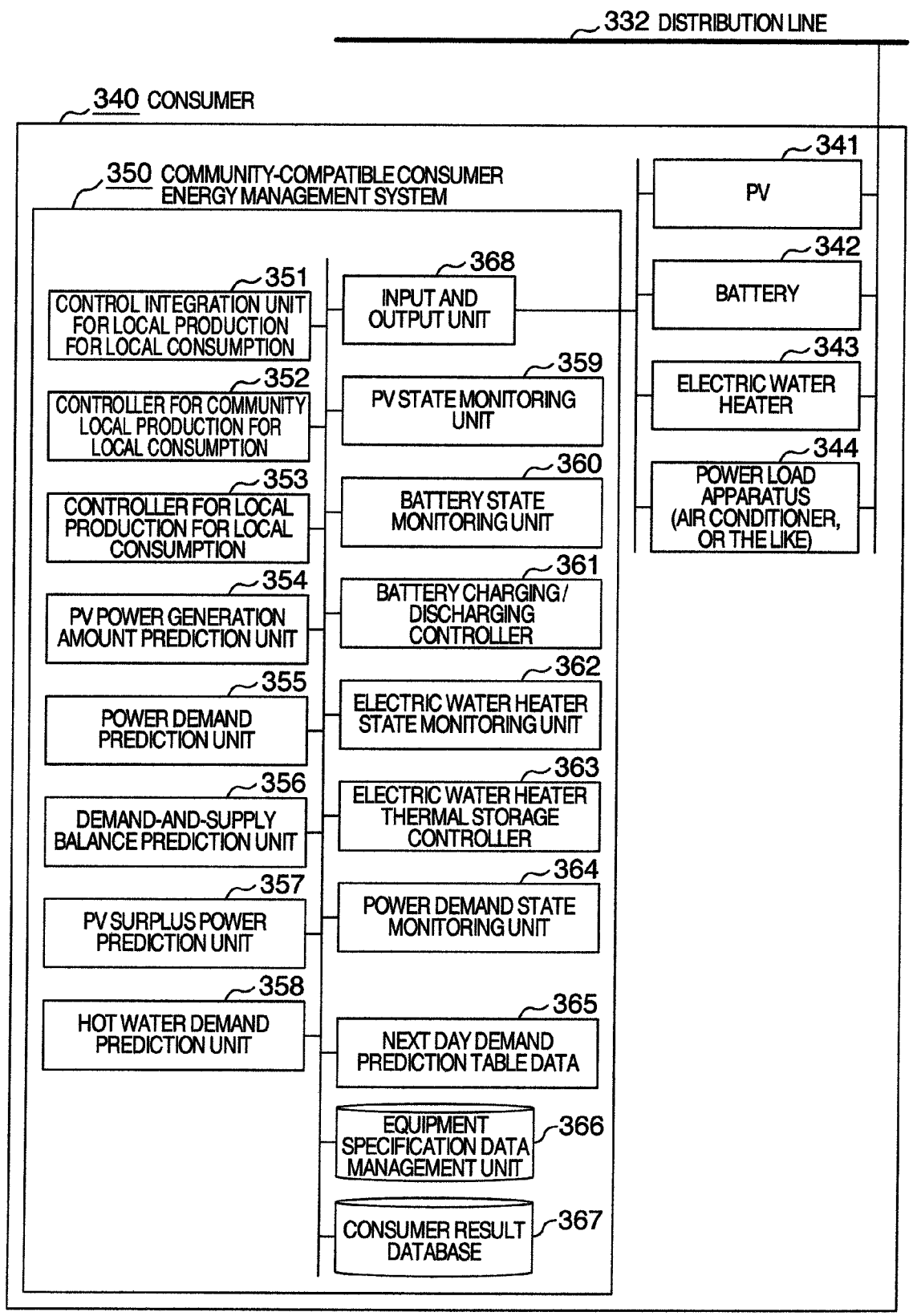
FIG. 13 is a functional block diagram illustrating a configuration example of a community-compatible consumer energy management apparatus of the system according to the third embodiment of the present invention.

FIG. 13 is a functional block diagram illustrating the community-compatible consumer energy management apparatus 350. The community-compatible consumer energy management apparatus 350 has the controller for community-compatible local production for local consumption and a control integration unit for local production for local consumption in addition to the configuration of the consumer energy management apparatus 120 of FIG. 2 described in the first embodiment. Further, processing of the controller for local production for local consumption is changed in association with the above-described facts. Hereinafter, only the different points will be described in detail.

In the configuration of FIG. 2, the controller for local production for local consumption 121 transmits a control signal for the thermal storage operation adjustment of the electric water heater to the electric water heater thermal storage controller 131. On the other hand, in the configuration of FIG. 13, the controller for local production for local consumption 353 transmits a control signal to the control integration unit for local production for local consumption 351.

When receiving a start signal for community local production for local consumption via the input and output unit 368, the controller for community-compatible local production for local consumption 352 transmits a start signal for the thermal storage operation of the electric water heater 343 to the control integration unit for local production for local consumption 351. The thermal storage operation start signal includes the power consumption amount target value data, and a value of the above-described data is set to that of the adjustment amount received by the start signal for community local production for local consumption.

The control integration unit for local production for local consumption 351 transmits a control signal for the thermal storage suppression or the thermal storage start to the electric hot water thermal storage suppression unit 363 as follows. Specifically, when receiving a control signal only from any one of the controller for local production for local consumption 353 and the controller for community-compatible local production for local consumption 352, the control integration unit 351 transmits the received control signal. When receiving a control signal from both the controllers, the control integration unit 351 has priority of the thermal storage start control signal over the thermal storage suppression control signal, and transmits the received control signal. Further, when receiving both of the thermal storage start control signals, the control integration unit 351 adopts and transmits the control signal with a larger power consumption amount target value.

The above-described community energy management apparatus 390 and the community-compatible consumer energy management apparatus 350 perform the processing until receiving a stop signal from the user or the external apparatus via the respective input and output units.

As to the other portions, the community-compatible consumer energy management apparatus 350 has the same configuration as that of the energy management apparatus 120 described in the first embodiment. Specifically, the community-compatible consumer energy management apparatus 350 includes respective units as follows in addition to the already-described control integration unit for local production for local consumption 351, controller for community-compatible local production for local consumption 352, and controller for local production for local consumption 353. The community-compatible consumer energy management apparatus 350 includes a photovoltaic power generation amount prediction unit 354, power demand prediction unit 355, demand-and-supply balance prediction value 356, photovoltaic power generation surplus power prediction unit 357, hot-water demand prediction unit 358, photovoltaic power generation state monitoring unit 359, battery state monitoring unit 360, battery charging/discharging controller 361, electric water heater state monitoring unit 362, electric water heater thermal storage controller 363, power demand state monitoring unit 364, next day demand prediction table data storage unit 365, equipment specification data management unit 366, consumer result database 367, and input and output unit 368.

In every unit except the already-described control integration unit for local production for local consumption 351, controller for community-compatible local production for local consumption 352, and controller for local production for local consumption 353, the same processings as those of the respective units of the energy management apparatus 120 described in the first embodiment are performed.

According to the third embodiment, when controlling the photovoltaic generated power in units of community, the community-compatible consumer energy management apparatus 350 can more consume the photovoltaic power generation surplus power. Further, the community-compatible consumer energy management apparatus 350 can operate local production of power for local consumption with high efficiency and low carbon emissions.

Figure 14:
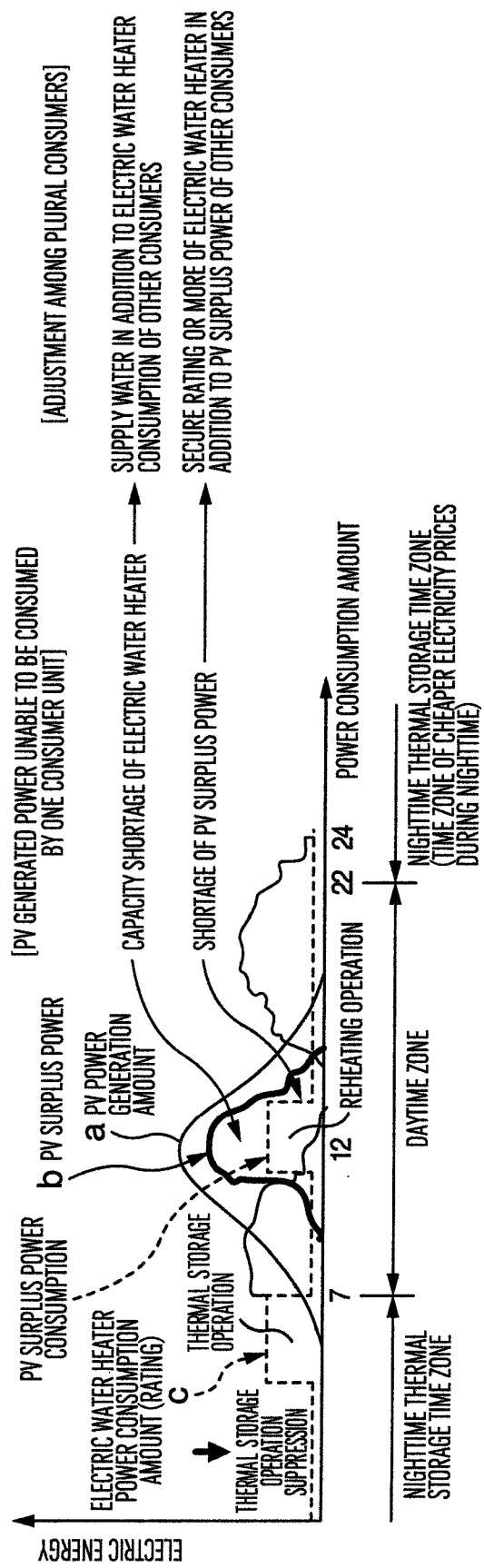
FIG. 14 is a characteristic diagram illustrating one example of a surplus power consumption state according to the third embodiment of the present invention.

FIG. 14 illustrates a photovoltaic power generation surplus power consumption state based on the electric water heater 343. FIG. 14 is the same diagram as FIG. 8 illustrated in the first embodiment. As illustrated in FIG. 14, the community-compatible consumer energy management apparatus 350 can consume the photovoltaic generated power unable to be consumed by one consumer unit due to capacity shortage of the electric water heater and the battery. Further, when viewed from the consumer whose surplus power of photovoltaic power generation is short, the community-compatible consumer energy management apparatus 350 can secure the rating or more of the electric water heater in addition to the photovoltaic power generation surplus power of other consumers.

Accordingly, the proposed community-compatible consumer energy management apparatus 350 can more consume the photovoltaic power generation surplus power, and operate local production of power for local consumption with extremely high efficiency.

4. Fourth Embodiment

Next, the energy management system according to a fourth embodiment of the present invention will be described with reference to FIGS. 15 and 16. In FIGS. 15 and 16, the same circuit elements as those of FIGS. 1 to 14 in the first to third embodiments are indicated by the same reference numerals as those of FIGS. 1 to 14 in the first to third embodiments.

In an example according to the fourth embodiment, an operating system for system cooperation type community local production for local consumption is illustrated such that the consumer energy management apparatus operate cooperatively among a plurality of consumers, and further, with the system operating system of the power system.

FIG. 15 illustrates the entire system configuration example according to the present embodiment. A system configuration of FIG. 15 according to the fourth embodiment is a system configuration acquired by combining one system configuration according to the second embodiment illustrated in FIG. 9 and another system configuration according to the third embodiment illustrated in FIG. 11. Note that the community energy management apparatus is configured as a system cooperation type community energy management apparatus 490. Further, a consumer cooperation server 510 and the system cooperation type community energy management apparatus 490, and the system cooperation type community energy management apparatus 490 and community-compatible consumer energy management apparatus 414, 422, and 450 are connected with each other in a communicatable manner via a communication network 431, and operate cooperatively, respectively. The consumer cooperation server 510 performs the same processing as that of the consumer cooperation server 52 described in the second embodiment. Note, however, that the consumer cooperation server 510 does not transmit a start signal for system cooperation type local production for local consumption to the system cooperation type community-compatible consumer energy management apparatus on the consumer end, but transmits a start signal for system cooperation type community local production for local consumption to the system cooperation type community energy management apparatus 490 of the community center 480. The start signal for system cooperation type community local production for local consumption includes the demand amount increasing target value in the same manner as in the second embodiment.

The community-compatible consumer energy management apparatus 450 has the same configuration and performs the same processing as those of the community-compatible consumer energy management apparatus 350 according to the third embodiment. Specifically, the community-compatible consumer energy management apparatus 450, installed in a consumer 440, controls a battery 442 and an electric water heater 443. The consumer 440 has also a power load apparatus 444.

Further, a consumer 410 as a school 411 has a battery 412 and an electric water heater 413, and they are controlled by the community-compatible consumer energy management apparatus 414. The community-compatible consumer energy management apparatus 422 is an energy management apparatus for a consumer 420 with an electric water heater 421 (without photovoltaic power generation facilities).

FIG. 16 is a functional block diagram illustrating the system cooperation type community energy management apparatus 490.

The system cooperation type community energy management apparatus 490 has a controller for system cooperation type community local production for local consumption 493 and a control integration unit for community local production for local consumption 491 in addition to the configuration of the community energy management apparatus 390 of FIG. 12 described in the third embodiment. Further, processing of the controller for community local production for local consumption 492 is changed in association with the above-described facts. In the other configuration of the community energy management apparatus 390, the system cooperation type community energy management apparatus 490 is configured by an input and output unit 497, a consumer energy management apparatus communication unit 494, a consumer data management unit 496, a community state monitoring unit 495, and a controller for system cooperation type community local production for local consumption 496.

Hereinafter, only portions in which the system cooperation type community energy management apparatus 490 differs from the community energy management apparatus 390 of FIG. 12 will be described in detail.

The controller for system cooperation type community local production for local consumption 493 periodically performs the following processings when receiving any one or both of the start signal for system cooperation type community local production for local consumption and the start signal for community local production for local consumption via the input and output unit 497. That is, the controller 493 determines the consumer to be started for controlling the system cooperation type community local production for local consumption and the adjustment amount, and transmits the control start signal for community local production for local consumption to the community-compatible consumer energy management apparatus 450 of the respective consumers via the consumer energy management apparatus communication unit 494. The control start signal for community local production for local consumption includes the adjustment amount data of each consumer. The controller 493 repeatedly performs the above-described processings until receiving a stop signal from the user or the external apparatus via the input and output unit 497.

(1) Setting of default value of photovoltaic power generation surplus power amount in the community When receiving no start signal for system cooperation type community local production for local consumption, the controller for system cooperation type community local production for local consumption 493 sets to zero a default value of the photovoltaic power generation surplus power amount in the community. On the other hand, when receiving the start signal for system cooperation type community local production for local consumption, the controller 493 sets the demand amount increasing target value to a default value of the photovoltaic power generation surplus power amount in the community.

(2) Update of photovoltaic power generation surplus power amount in the community The controller 493 acquires the total demand-and-supply balance amount in the community from the community state monitoring unit 495, and subtracts it from the total demand-and-supply balance reference amount in the community. If the acquired value is larger than the previously-calculated photovoltaic power generation surplus power amount in the community, the controller 493 updates a value of the photovoltaic power generation surplus power amount in the community to the above-described acquired value.

(3) Collection of each consumer data

The controller 493 acquires the present electric water heater power consumable amount data, average COP data as an equipment specification value of the electric water heater, and average heat radiation loss data of each consumer in the community from the consumer data management unit 496.

(4) Determination of consumer to be started for controlling the system cooperation type community local production for local consumption and the adjustment amount The controller 493 selects a consumer to be started in order from the consumer with a large average COP of the electric water heater, totalizes the electric water heater power consumable amount, and terminates the selection when the totalized amount is larger than the photovoltaic power generation surplus power amount in the community.

The controller 493 sets the adjustment amount of the selected consumers by using the electric water heater power consumable amount, respectively.

However, the controller 493 subtracts the amount by which the totalized value of the electric water heater power consumable amount is larger than the photovoltaic power generation surplus power amount in the community from the adjustment amount of the finally-selected consumer.

According to the fourth embodiment, the proposed community-compatible consumer energy management apparatus can cooperatively perform controls based on the system operation and cooperation controls in the community, more consume the photovoltaic power generation surplus power, and further perform an operation with high efficiency.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An energy management system comprising an energy storage controller for performing control to store power generated by photovoltaic power generation facilities in energy storage facilities, comprising:

a battery and an electric water heater as energy storage facilities;

a control unit configured to control thermal storage of the electric water heater and charging of the battery as the energy storage controller;

an equipment data management unit configured to manage data on charging/discharging loss of the battery and data on heat radiation loss of the electric water heater;

a system operation calculation unit for predicting a voltage distribution at a predetermined time of a distribution system or a demand-and-supply balance amount of the entire system by using state monitoring data of a power system; and a consumer cooperation calculation unit for acquiring prediction information on the voltage distribution at a predetermined time of the distribution system or on the demand-and-supply balance amount from the system operation calculation unit and calculating a demand amount increasing a target value necessary for avoiding a power generation amount suppression of photovoltaic power generation facilities on a consumer end;

wherein the control unit acquires the demand amount increasing the target value from the consumer cooperation calculation unit, and controls the energy storage facilities so as to satisfy the demand amount increasing the target value on the consumer end; and wherein the equipment data management unit causes the control unit to perform control to compare the charging/discharging loss and the heat radiation loss, and to give priority based on the comparison to the energy storage facility that more reduces loss and store energy therein.

2. The energy management system according to claim 1, further comprising a thermal storage suppression unit for suppressing a thermal storage operation during a nighttime of the electric water heater as the energy storage controller, wherein the thermal storage suppression unit manages suppression rate data on the thermal storage operation during the nighttime, and interrupts the thermal storage operation under conditions that a reference index value of thermal storage termination conditions during the nighttime in a normal case where the thermal storage operation is not suppressed reaches a dividing point of a suppression rate between a value of a thermal storage operation starting point and a value of normal thermal storage termination conditions.

3. The energy management system according to claim 2, further comprising a thermal storage start unit for starting a thermal storage operation during a daytime of the electric water heater as the energy storage controller, wherein the thermal storage start unit determines a target value on a power consumption amount of the electric water heater, and controls a thermal storage operation such that the electric water heater follows the target value on the power consumption amount.

4. The energy management system according to claim 3, wherein the energy storage controller controls an energy storage operation across the photovoltaic power generation facilities and energy storage facilities of a plurality of consumers.

5. An energy management apparatus for performing control to store power generated by photovoltaic power generation facilities in a battery and an electric water heater, comprising:

a control unit configured to control thermal storage of the electric water heater and charging of the battery;

an equipment data management unit configured to manage one data on charging/discharging loss of the battery and another data on heat radiation loss of the electric water heater;

a system operation calculation unit for predicting a voltage distribution at a predetermined time of a distribution system or a demand-and-supply balance amount of the entire system by using state monitoring data of a power system; and a consumer cooperation calculation unit for acquiring prediction information on the voltage distribution at a predetermined time of the distribution system or on the demand-and-supply balance amount from the system operation calculation unit and calculating a demand amount increasing a target value necessary for avoiding a power generation amount suppression of photovoltaic power generation facilities on a consumer end;

wherein the control unit acquires the demand amount increasing the target value from the consumer cooperation calculation unit, and controls the energy storage facilities so as to satisfy the demand amount increasing the target value on the consumer end; and wherein the equipment data management unit causes the control unit to perform control to compare the charging/discharging loss and the heat radiation loss, and to give priority based on the comparison to the energy storage facility more reducing loss and store energy therein.

6. The energy management apparatus according to claim 5, further comprising a thermal storage suppression unit for suppressing a thermal storage operation during the nighttime of the electric water heater, wherein the thermal storage suppression unit manages suppression rate data on the thermal storage operation during the nighttime, and interrupts the thermal storage operation under conditions that a reference index value of thermal storage termination conditions during the nighttime in a normal case where the thermal storage operation is not suppressed reaches a dividing point of a suppression rate between a value of a thermal storage operation starting point and a value of normal thermal storage termination conditions.

7. The energy management apparatus according to claim 6, further comprising a thermal storage start unit for starting the thermal storage operation during a daytime of the electric water heater, wherein the thermal storage start unit determines a target value on a power consumption amount of the electric water heater, and controls the thermal storage operation such that the electric water heater follows the target value on the power consumption amount.

8. An energy management apparatus for performing control to store power generated by photovoltaic power generation facilities on a plurality of neighboring consumer ends in energy storage facilities including batteries and electric water heaters on the plurality of consumer ends, comprising:

an equipment data management unit configured to manage one data on charging/discharging loss of the batteries on the respective consumer ends and another data on heat radiation loss of the electric water heaters on the respective consumer ends;

a system operation calculation unit for predicting a voltage distribution at a predetermined time of a distribution system or a demand-and-supply balance amount of the entire system by using state monitoring data of a power system; and a consumer cooperation calculation unit for acquiring prediction information on the voltage distribution at a predetermined time of the distribution system or on the demand-and-supply balance amount from the system operation calculation unit and calculating a demand amount increasing a target value necessary for avoiding a power generation amount suppression of photovoltaic power generation facilities on a consumer end;

wherein the equipment data management unit acquires the demand amount increasing the target value from the consumer cooperation calculation unit, and controls the energy storage facilities so as to satisfy the demand amount increasing the target value on the consumer end; and wherein the equipment data management unit causes the energy storage facilities of the respective consumers to perform control to compare the charging/discharging loss and the heat radiation loss, and to give priority based on the comparison to the energy storage facility more reducing loss and store energy therein.

9. The energy management apparatus according to claim 8, further comprising a thermal storage suppression unit for suppressing a thermal storage operation during a nighttime of the electric water heaters on the respective consumer ends, wherein the thermal storage suppression unit manages suppression rate data on the thermal storage operation during the nighttime, and interrupts the thermal storage operation on the respective consumer ends under conditions that a reference index value of thermal storage termination conditions during the nighttime in a normal case where the thermal storage operation is not suppressed reaches a dividing point of a suppression rate between a value of a thermal storage operation starting point and a value of normal thermal storage termination conditions.

10. The energy management apparatus according to claim 9, further comprising a thermal storage start unit for starting the thermal storage operation during a daytime of the electric water heaters on the respective consumer ends, wherein the thermal storage start unit determines a target value on a power consumption amount of the electric water heater, and controls the thermal storage operation such that the electric water heater follows the target value on the power consumption amount.

11. An energy management method comprising:

managing one data on charging/discharging loss of a battery for storing power generated by photovoltaic power generation facilities, and another data on heat radiation loss of an electric water heater for storing the power;

performing control to compare the charging/discharging loss and the heat radiation loss, and to give priority to an energy storage facility more reducing loss among the battery and the electric water heater and store the power therein;

predicting a voltage distribution at a predetermined time of a distribution system or a demand-and-supply balance amount of the entire system by using state monitoring data of a power system; and acquiring prediction information on voltage distribution at a predetermined time of a distribution system or on a demand-and-supply balance amount from the predicting step, and calculating a demand amount increasing a target value necessary for avoiding a power generation amount suppression of photovoltaic power generation facilities on a consumer end;

wherein the demand amount increasing the target value is acquired during the acquiring step, and energy storage facilities are controlled so as to satisfy the demand amount increasing the target value necessary for avoiding a power generation amount suppression of photovoltaic power generation facilities on the consumer end.

* * * * *